United States Patent [19]
Nitta et al.

[11] Patent Number: 5,598,833
[45] Date of Patent: Feb. 4, 1997

[54] SAFETY DEVICE FOR USE WITH PORTABLE HEATER

[75] Inventors: Tomio Nitta; Hideo Mifune; Masato Seki; Yosimitu Kaga; Noriyuki Serizawa, all of Shizuoka-ken, Japan

[73] Assignee: Tokai Corporation, Kanawaga-ken, Japan

[21] Appl. No.: 506,895

[22] Filed: Jul. 26, 1995

Related U.S. Application Data

[62] Division of Ser. No. 170,225, Dec. 28, 1993, Pat. No. 5,462,044.

[30] Foreign Application Priority Data

| May 1, 1992 | [JP] | Japan | 4-112553 |
| Jun. 17, 1992 | [JP] | Japan | 4-158044 |
| Jun. 17, 1992 | [JP] | Japan | 4-158137 |
| Jul. 22, 1992 | [JP] | Japan | 4-216352 |
| Oct. 2, 1992 | [JP] | Japan | 4-264655 |
| Nov. 12, 1992 | [JP] | Japan | 4-302178 |
| Mar. 31, 1993 | [JP] | Japan | 5-073627 |

[51] Int. Cl.⁶ .................... A47G 23/04
[52] U.S. Cl. .................. 126/262; 126/263.1; 431/13
[58] Field of Search .................. 431/13; 126/263.1, 126/262

[56] References Cited

U.S. PATENT DOCUMENTS

| 3,701,344 | 10/1972 | Walls et al. | |
| 3,718,815 | 2/1973 | McDonough et al. | 431/13 |
| 4,538,926 | 9/1985 | Chretien | |
| 4,751,912 | 6/1988 | Monette | 431/22 |
| 5,052,369 | 10/1991 | Johnson | |

*Primary Examiner*—Carl D. Price
*Attorney, Agent, or Firm*—Brumbaugh, Graves, Donohue & Raymond

[57] ABSTRACT

A portable heater includes a burner 10 disposed on the bottom of a combustion cylinder 2, a container to be heated 6 which is disposed in an upper part of the combustion cylinder for storing contents which are heated when the heater is in use, a fuel tank 12 for storing fuel gas to be supplied to the burner, and an ignition means 8 having an ignition lever 21 which causes the ignition of the burner. For use with such a portable heater, a safety device for preventing the container from being heated while it is sealed, a safety device which prevents the emission of gas when flames are unexpectedly extinguished, and an overturn safety device for automatically extinguishing flames when the heater is overturned are obtained in a simple structure.

4 Claims, 25 Drawing Sheets

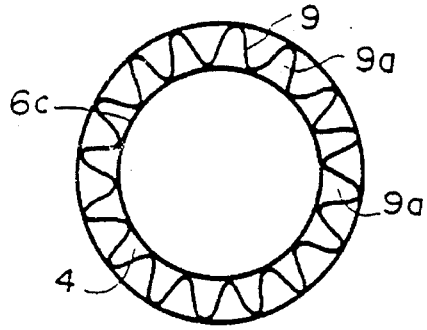
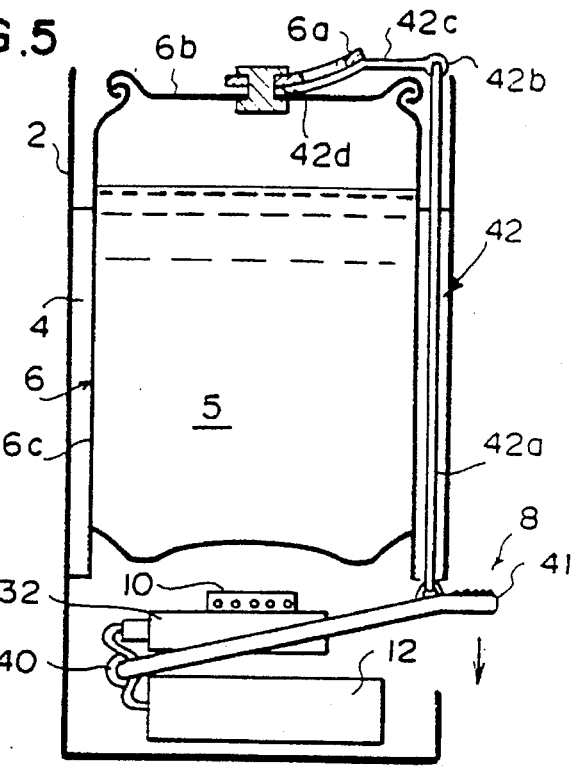
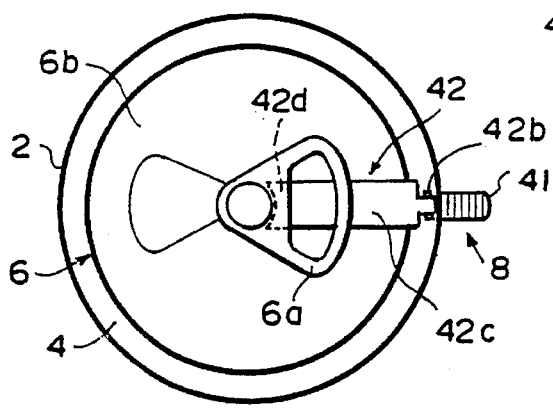
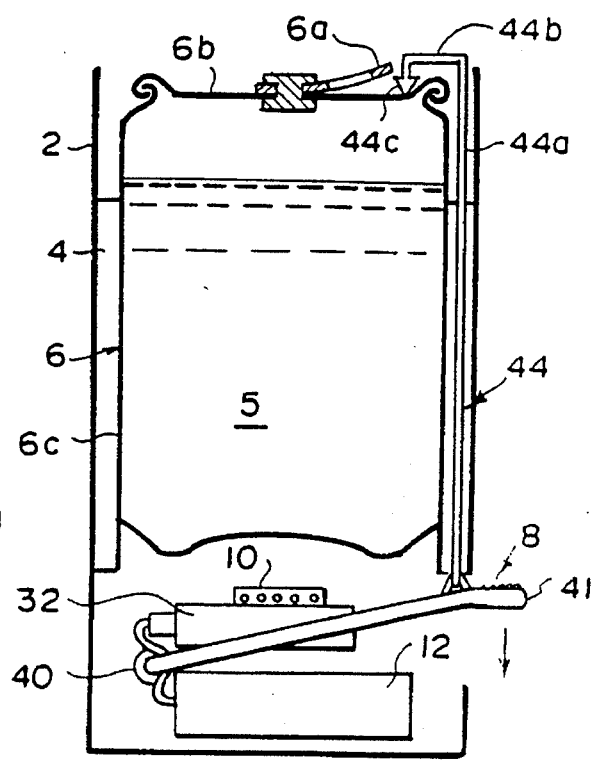
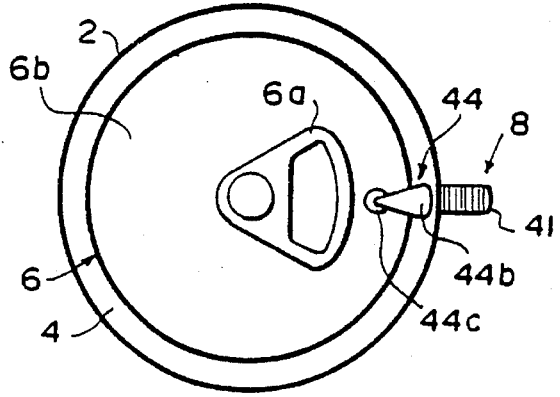

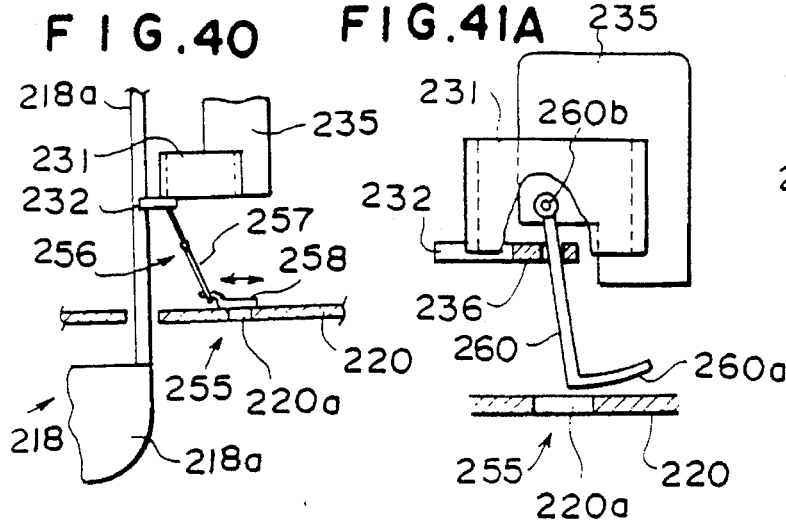
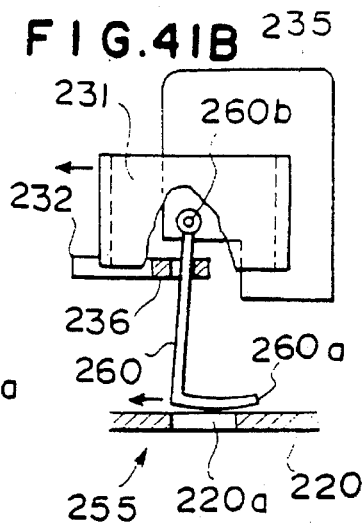
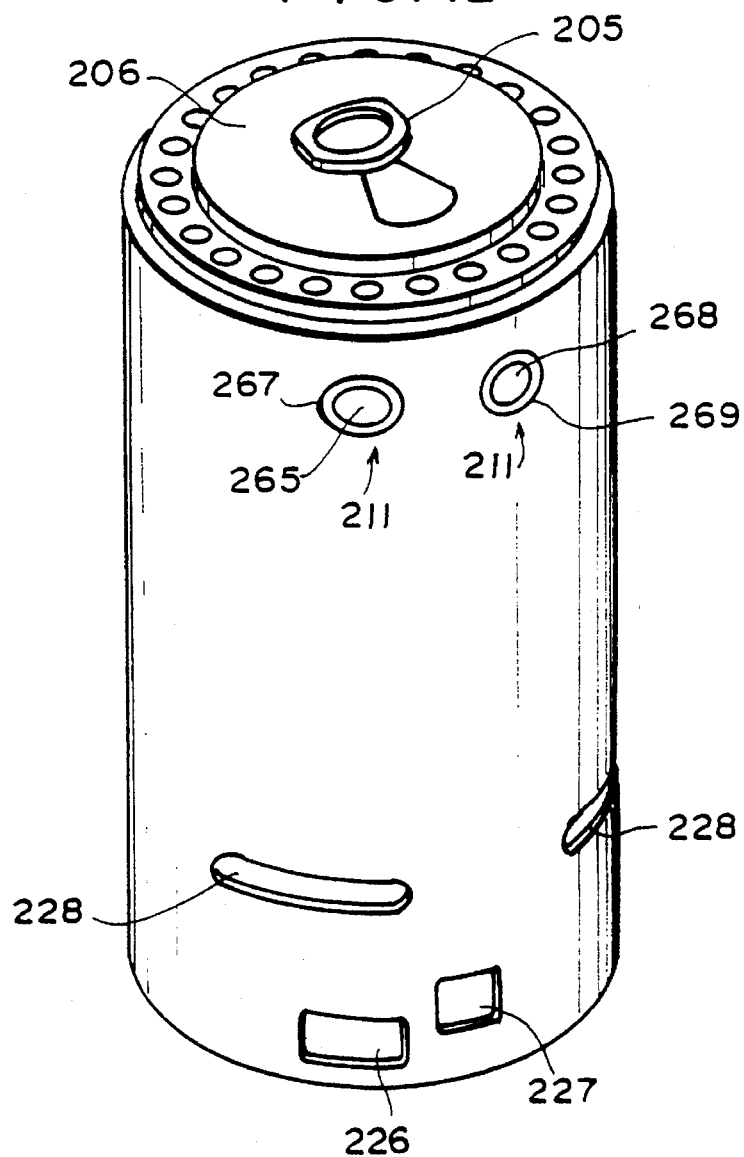

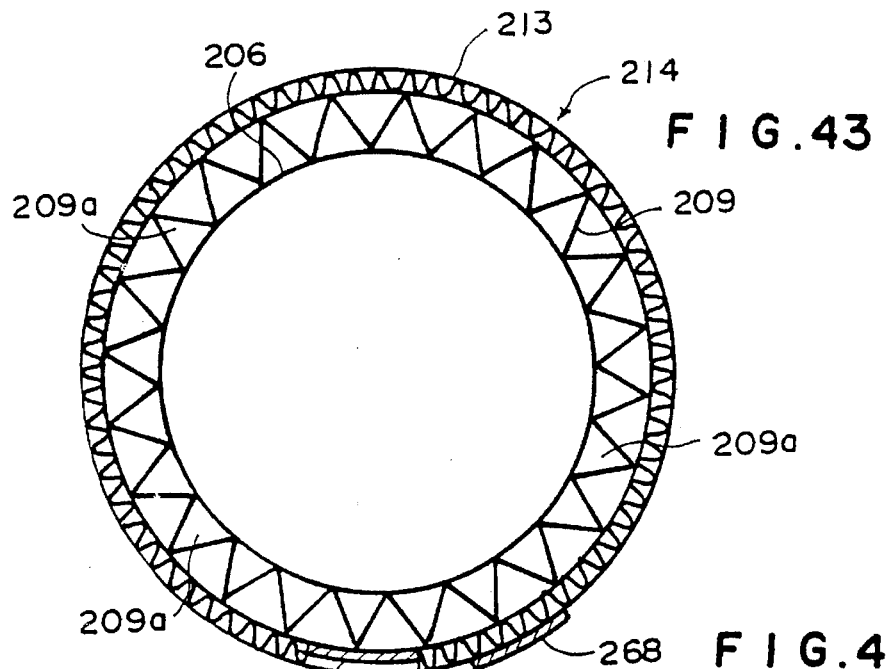

SAFETY DEVICE FOR USE WITH PORTABLE HEATER

This application is a division of application Ser. No. 08/170,225, filed on Dec. 28, 1993, now U.S. Pat. No. 5,462,044.

TECHNICAL FIELD

This invention relates to a safety device for use with a portable heater which causes a container to be heated, such as canned goods to be warmed by the combustion of gas.

BACKGROUND ART

During outdoor activities such as camping, a portable heater having a simple structure is considered as an appliance for easily heating water held in a container, canned goods or the like for the purpose of cooking precooked foods or making tea or coffee. Such a portable heater supports the container, the canned goods or the like, and, for instance, a fuel tank, a burner and an ignition means are arranged at the bottom of the heater. The emission and ignition of gas from the burner are carried out by the operation of an ignition lever, and heating is effected by combustion using a burner that is relatively small about the size of a gas lighter or thereabouts.

In a heater that effects heating by the combustion of gas, it is necessary to interrupt the emission of gas if flames go out for any reason during the combustion. To this end, several types of an extinguished-flame safety device have already been put forward, which interrupt the discharge of gas when flames go out.

Moreover, heaters, such as a gas stove for domestic use and a stove which uses kerosene, are usually equipped with an overturn safety device for automatically extinguishing flames in view of the prevention of a fire when the stove falls as a result of an earthquake or the like, and several types of mechanisms used as such a device have also been put forward.

In a portable heater such as previously mentioned, when a container to be heated is warmed by a burner, an internal pressure of the container body rises owing to an increase in temperature of the contents of the container if the container is heated while it is sealed. Eventually, several problems may arise which are ascribed to the rupture of the container during heating or the spewing-out of the contents of the container when the container is opened. Hence, it is necessary to maintain the container open to the atmosphere when being heated.

In view of the foregoing drawbacks, the object of this invention is to provide a safety device for use with a portable heater which automatically bores a hole in a container body when the container is heated.

Another object of this invention is to provide a safety device for use with a portable heater that ensures easy opening of the container and allows ignition operation to be performed only after the container is opened and also releases the container from its closed state when it is heated.

By the way, in the case of a portable heater, in order to ascertain the ignition of gas after ignition operation, it is troublesome for a user to lean over and visually check flames through a verification window. The extinguished-flame safety device of some portable heaters may require a much longer time to check the ignition of gas. Hence, it is necessary to make the verification of ignition easy to perform. The portable heater also encounters a problem that a user may burn his hand or spill the contents of the heater when he inadvertently makes contact with a high temperature section, because the user is not aware of whether or not the heater itself becomes hot after heating has been completed.

For this reason, another object of the present invention is to provide a safety device that facilitates a check to see whether or not ignition is effected and attracts a user's attention when handling a heater by indicating the temperature.

Even a portable heater with a simple structure as mentioned above suffers from insufficient heating which will occur when flames are unexpectedly extinguished by wind or the like, because the volume of a fuel tank is limited. Thus, there are demands for an extinguished-flame safety device that interrupts the discharge of gas when flames unexpectedly go out and an overturn safety device that automatically extinguishes a flame when the heater falls over. However, a conventional safety device used with a heater which employs town gas is complicated in structure, and also adds to the cost of the heater, thereby rendering the safety device disadvantageous. Hence, there is also a demand for these safety devices to have a simplified structure.

To this end, another object of this invention is to provide an extinguished-flame safety device or an overturn safety device which is applicable to a simple and small-sized portable heater.

DISCLOSURE OF THE INVENTION

To overcome the aforementioned drawbacks, a safety device for use with a portable heater according to this invention comprises a burner disposed on the bottom of a combustion cylinder; a container to be heated, disposed at an upper part of the cylinder, for containing contents to be heated when the heater is in use; a fuel tank for storing fuel gas to be supplied to the burner; an ignition means having an ignition lever which performs ignition operation of the burner; and a hole-opening lever which moves in conjunction with the ignition lever and automatically bores a vent hole for steam in an upper part of the container body.

With such an arrangement, when the ignition lever is operated to ignite a burner so that the container can be heated, the hole-opening lever is operated in association with the operation of this ignition lever, whereby a vent hole is automatically bored in an upper part of the container body. Steam, or the like, produced as a result of the heating of contents is expelled from this vent hole, so that the internal pressure of the container drops. This prevents the container from being ruptured while being heated or the contents from being spewed out when the container is opened.

Another safety device for use with a portable heater, according to this invention, is provided with an operation rod that extends upward along a combustion cylinder with the lower end thereof coupled to the ignition means and the upper end thereof further extended upwardly past the combustion cylinder. The safety device is arranged in such a way that the ignition of a burner is carried out in accordance with the pressing of this operation rod. The safety device is also provided with an opening member that engages with a pull tab used for opening and formed on an upper part of the container and that opens the pull tab. This opening member is arranged to enable the ignition of the operation rod to be performed in conjunction with the rise of the opening member after the container has been opened.

With this arrangement, the container is opened by operating the opening member, and hence smaller force is needed to actuate an operating section when compared with a case when a pull tab is directly removed. After the container has been opened by the operation of this opening member, the ignition is effected by raising the opening member to a further extent. Hence, the container becomes opened before an ignition operation is performed. This prevents the container from being heated while being sealed, and also the implosion of the container while heated or the eruption of contents of the container when it is opened.

It is desirable that the upper end of the operation rod should be arranged in a foldable manner, and that the upper end of the operation rod should be housed below the lower surface side of the opening member when the container remains out of ignition.

Still another safety device for use with a portable heater, according to this invention, is provided with an extinguished-flame safety device: a bimetal member which responds to a rise in temperature resulting from the combustion of a burner which burns gas supplied from a fuel tank; a regulation member that moves in accordance with deformation of the bimetal member due to a rise in temperature caused by the combustion of the burner, and regulates return movement of the ignition lever by partially engaging with the ignition lever, and meanwhile, allows the ignition lever to move when the burner is in an extinguished state; and an extinguishing operation member for displacing the regulation member which remains in an engaged state in a direction of disengagement.

In this arrangement, when combustion is started by the operation of the ignition lever to ignite the burner, the regulation member that moved in accordance with the deformation of the bimetal member due to a rise in temperature engages with the ignition lever, so that the ignition lever is held in an igniting state. This causes the emission of gas from the burner to be maintained and, hence, combustion to be continued. In the meantime, if flames go out for any reason during combustion, the bimetal member is deformed upon responding to a drop in temperature, and the regulation member is disengaged from the ignition lever. The ignition lever thus released returns to its original position, thereby interrupting the discharge of gas from the burner. Thus, it is possible to add a compact and simple extinguished-flame safety device which ensures operation to the portable heater.

It is desirable that a heat sensing part which transmits combustion heat of the burner be connected to the bimetal member. In addition, a link mechanism for switching indications of a combustion indication section in response to the deformation of the bimetal member may be arranged.

Another safety device of this invention is characterized in that a temperature indication means is laid on the outer periphery of a combustion cylinder. It is preferable that one of the temperature indication means be directly disposed on the surface of the combustion cylinder, whilst the other of the means be provided on a heat insulating material laid on the outer periphery of the combustion cylinder.

In this arrangement, when a container is heated in accordance with ignition resulting from the operation of the ignition lever, heat is immediately transmitted to the surface of the combustion cylinder. The heat then activates the temperature indication means laid on the combustion cylinder, which allows the ignition of gas to be verified easily. Moreover, in the case of the safety device in which the temperature indication means is disposed on the heat insulating material, it can be discerned that the surface of the combustion cylinder is hot when a temperature increases as a result of the continuation of heating. Hence, it is possible to attract a user's attention when handling the container.

Yet another safety device of this invention is provided with an extinguished-flame safety device that retains an ignition lever of an ignition means by means of a bimetal member which is deformed as a result of a rise in temperature resulting from combustion. In connection with the updraft of combustion gas along the combustion chamber, an ignition verification member, which is heated by the combustion gas and is made of heat sensitive material that causes discoloration or the development of color in accordance with a rise in temperature, is disposed. The heat sensing characteristics of this ignition verification member are set to cause discoloration or the development of color when the ignition lever is retained in a combustion position by means of the bimetal member of the extinguished-flame safety device.

In this arrangement, the temperature of the combustion cylinder rises in response to the start of combustion by the operation of the ignition lever. This causes the discoloration or the development of color of the heat sensing material of the ignition verification member, whereby the ignition is verified. The heat sensing characteristics of this member are set so that ignition can be verified when the ignition lever is held in a combustion position resulting from the operation of the extinguished-flame safety device. Thereby, the operation of the extinguished-flame safety device is also verified.

Another safety device of this invention is characterized in that it is provided with: an overturn sensor for detecting an overturn by the movement of a sensor member between an upright state and an overturned state of a heater; and a link member which causes the supply of gas to a burner to be opened and closed in conjunction with the operation of the overturn sensor and interrupts the supply of gas upon detection of an overturn by means of the overturn sensor.

With this arrangement of the overturn safety device, the supply of gas to the burner is continued, and heating owing to normal combustion is effected when the heater is used while standing upright. If the heater falls over for any reason during combustion, the overturn sensor detects this overturned state of the heater. Then, the sensor member moves, and interrupts the supply of gas to the burner via the link member. An overturn function is obtained in a simple structure which automatically interrupts the emission of gas from the burner when the heater falls over and extinguishes a fire.

BRIEF DESCRIPTION OF THE DRAWINGS

FIG. 4 is a horizontal cross-sectional schematic view showing an example of structure between a combustion cylinder and a container to be heated of the portable heater;

FIG. 5 is a cross-sectional view showing the basic structure of a portable heater equipped with a safety device according to a second embodiment of this invention;

FIG. 6 is a schematic plan view showing the portable heater shown in FIG. 5;

FIG. 7 is a cross-sectional view showing the basic structure of a portable heater equipped with a safety device according to a third embodiment of this invention;

FIG. 8 is a schematic plan view of the portable heater as shown in FIG. 7;

FIG. 40 is an schematic view chart showing an example of the arrangement of a combustion display mechanism;

FIGS. 41A and 41B are schematic views showing other examples of the arrangement of the combustion display mechanism;

FIG. 42 is an appearance perspective view showing a portable heater equipped with a safety device according to a ninth embodiment of this invention;

FIG. 43 is a cross-sectional plan view of the heater as shown in FIG. 42;

FIG. 44 is an appearance perspective view of the portable heater showing a modified example of the heater as shown in FIG. 42;

BEST MODES FOR PRACTICING THE INVENTION

With reference to the drawings, each embodiment of the present invention will be described hereinbelow.

First Embodiment

Figure 1:
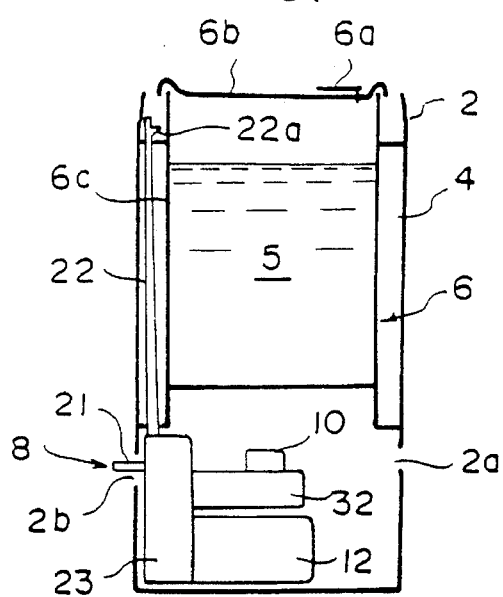
FIG. 1 is a cross-sectional view showing the basic structure of a portable heater which is equipped with a safety device according to a first embodiment of this invention.
Figure 2:
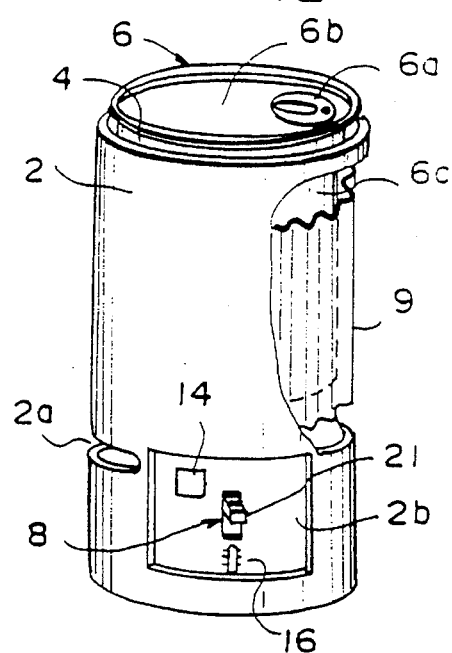
FIG. 2 is a partially cut-away perspective view showing one example of the appearance of the portable heater as shown in FIG. 1.

FIGS. 1 and 2 show a portable heater equipped with a safety device of this embodiment. This is an example of a safety device for avoiding closed heating by automatically boring a hole in a container to be heated upon ignition.

Basically, the portable heater is composed of: a cylindrical combustion cylinder 2 with at least its upper end open; a container to be heated (canned goods) 6 fixedly housed in an upper inside of this combustion cylinder 2 with a gap 4 for the updrafting of combustion gas formed between it and the cylinder 2, and also made of a cylindrical heat-resistant container body 6 having a lid 6d in which an opening pull-tab 6c is provided on the upper end surface of the lid; a burner 10 equipped with an ignition means 8, and fixedly housed inside a lower portion of the combustion cylinder 2 for heating the container 6; and a fuel tank 12 fixed inside the lower portion of the cylinder 2 for supplying fuel to the burner 10. The container 6 stores contents 5 to be heated when the heater is in use, and the cylinder 2 is provided with an air inlet port 2a for supplying air from the outside to the burner 10 and an opening 2b which allows the ignition means 8 to be operated from the outside.

The opening 2b, made on the cylinder 2 in order to allow the ignition means 8 to be operated from the outside, is provided with a window 14 that enables the verification of flames of the burner 10 from the outside and a scaled window 16 for the verification of the quantity of remaining fuel in the tank 12.

The ignition means 8 of the burner 10 is also provided with an ignition lever 21 which supplies gas to the burner 10 and effects ignition. This ignition lever 21 is provided with a hole opening lever 22 which operates in conjunction with the ignition lever. The upper end of this hole-opening lever 22 extends upwards through the gap 4, and the lever has a pointed protuberance 22a for boring purposes that is formed at a location of the lever which is opposite to the top of the container body 6c.

Figure 3:
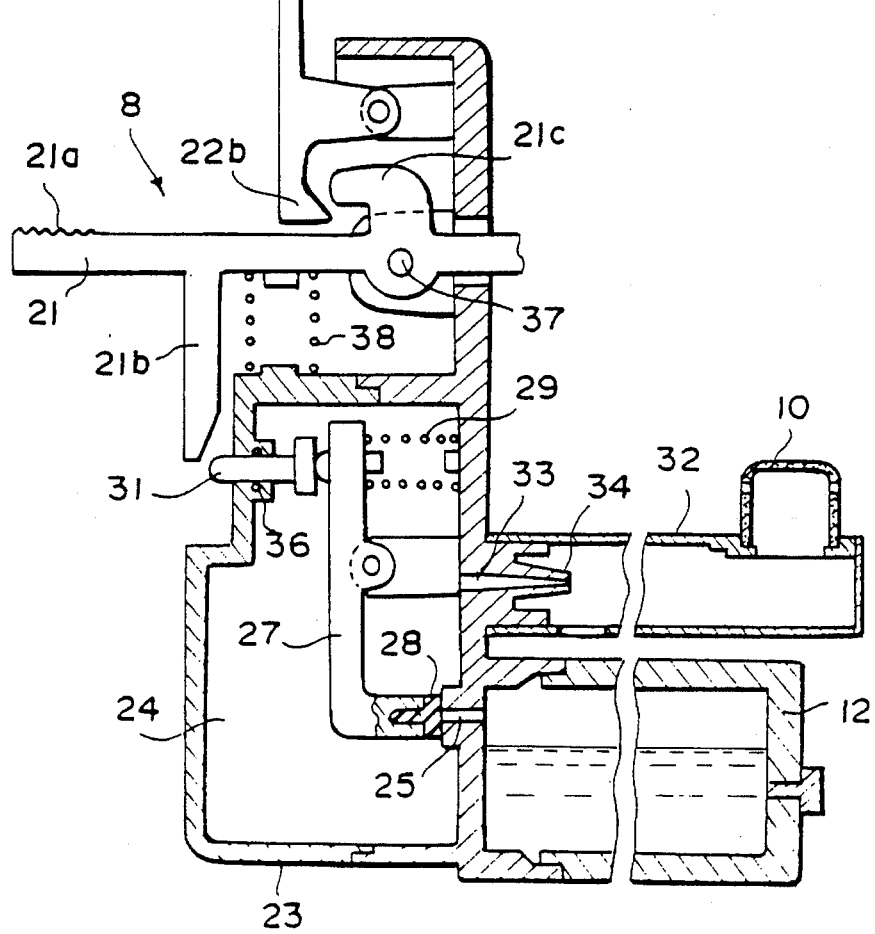
FIG. 3 is a cross-sectional view of the chief portion of the heater that illustrates a detailed example of the structure of an ignition means of a burner.

FIG. 3 shows the structure of the burner 10 and a link structure between the ignition lever 21 and the hole-opening lever 22. A housing 23 is connected to the side of the fuel tank 12 that contains pressurized gas, thereby constituting a gas chamber 24 that becomes wider upwardly. A connection hole 25 is formed on the side wall on an upper part of the tank 12 so as to be connected with the gas chamber 24. This connection hole 25 is opened and closed by bringing a valve rubber 28 on one end of a pivotal lever disposed within the gas chamber 24 to come into pressed contact with the hole. The middle of the pivotal lever 27 is rotatably supported by a fulcrum, and the other end of the lever is forced in a direction of closing of the valve by means of a return spring 29. The end of a lever pin 31 comes into contact with a surface that is opposite to this return spring 29.

A gas pipe 32 is disposed on the side of the gas chamber 24 above the fuel tank 12 for supplying gas from the chamber 24 to the burner 10. The burner 10 is attached to the upper end of this gas pipe 32. A nozzle 34 with its end sharply formed is disposed at the base portion of the burner so as to be connected with an emission port 33 which is opened to the gas chamber 24. The gas pipe 32 and the burner 10 may be formed in an integrated manner.

The lever pin 31 projects from the housing 23 while the end thereof is sealed by means of an O-ring 36, and the ignition lever 21 of the ignition means 8 links with this lever pin 31. In other words, the ignition lever 21 is supported by a pivotal pin 37 in a vertically pivotable manner. An operation part 21a is projected from the cylinder 2, and it remains in an operable state. A link part 21b downwardly extends from the ignition lever, and is forced in a return direction by means of a spring 38 interposed between the lever and the housing. The lower end of the link part 21b comes into contact with the end of the lever pin 31 when the ignition lever 21 is rotated downwards, thereby thrusting the lever pin 31 into the housing.

Although a specific structure is not illustrated, a lock mechanism is arranged to maintain the thrusting action of the lever pin 31 and the opening action of the pivotal lever 27 during ignition and combustion. Similarly, though a specific structure is not illustrated, a discharge electrode or the like is disposed to cause the burner 10 to be ignited by electric discharge by the operation of a piezoelectric unit in conjunction with downward rotations of the ignition lever 21.

An engaging protuberance 21c is formed on the ignition lever 21 above the pivotal pin 37, and this protuberance 21c meshes with a lower end engaging part 22b of the hole-opening lever 22. The hole-opening lever 22 is supported by a pin in a rotatable fashion, and is arranged in such a manner that when the engaging protuberance 21c of the ignition lever 21 comes into contact with the lower end engaging part 22b, the lever 22 rotates, and the upper end protuberance 22a is forced against the side surface of an upper part of the container body 6c to bore a vent hole in the body 6c.

The gap 4 is established between the container body 6c of the container 6 and the combustion cylinder 2 for the updraft of combustion gas, and the structure for forming this gap 4 also serves as a means for fixing the cylinder 2 and the body 6c. Specifically, as seen from a horizontal cross section of FIG. 4, a corrugated partition plate 9 that longitudinally extends is sandwiched between the cylinder 2 and the body 6c, and corrugated inner spacing 9a of the corrugated plate 9 serves as the gap 4 for the updraft of combustion gas.

The operation of the embodiment set forth above will now be described. When combustion is started with the use of the burner 10 to heat the container 6, the operation part 21a of the ignition lever 21 is pressed. The link part 21b of the lever thrusts the lever pin 31 into the housing, which causes the pivotal lever 27 to rotate against the return spring 29. Then, the valve rubber 28 is separated from the connection hole 25, and fuel is supplied to the gas chamber 24 from the fuel tank 12. Fuel within this chamber 24 is emitted from the burner 10 via the emission port 33, the nozzle 34 and the gas pipe 32.

Combustion is effected by the ignition of this discharged gas, and the container body 6c is directly heated from underneath by flames which are being discharged. The lower end of the partition plate 9 extends downwards past the bottom of the container body 6c, and hence hot air produced by flames from the burner 10 flow upwards solely along the inner spacing 9a that faces the peripheral wall of the body 6c. Thus, the container 6 is efficiently heated, and ambient air flows through a spacing 9b, thereby suppressing a rise in temperature of the outside of the combustion cylinder 2 and hence facilitating the handling of the same. Moreover, the corrugated partition plate 9 serves to keep the contents 5 warm after the heating of the contents within the container 6 has been completed.

Concurrently with the supply of fuel and ignition, the engaging protuberance 21c engages with the engaging part 22b of the hole-opening lever 22 in accordance with the ignition operation of the lever 21, that is, the rotation of the lever 21. This causes the hole-opening lever 22 to rotate and automatically bore a vent hole in the container body 6c. Thus, a rise in internal pressure caused by heating is suppressed by expelling vapor or the like through the vent hole. When a flame is extinguished, the lever pin 31 is caused to protrude, whereby the pivotal lever 27 rotates under the thrusting force of the return spring 29. This causes the valve rubber 28 to close the connection hole 25, and hence the emission of gas is stopped. Thus, the combustion by the burner 10 is completed.

In the previous embodiment, a governor mechanism may be incorporated into the heater for regulating in such a manner that the pressure of supplied gas becomes substantially constant even when temperature varies. For instance, a diaphragm should preferably be disposed in such a way as that the pivotal lever 27 causes the diaphragm to be closed when the pressure of the gas chamber 24 rises but to be opened in accordance with a pressure drop.

Instead of the mechanism for opening and closing the supply of gas by the operation of the pivotal lever 27 in the previous embodiment, a valve mechanism for closing and opening the supply of gas may be disposed at the nozzle 34, and may be linked in such a fashion that the valve mechanism is operated and opened in accordance with the ignition operation of the ignition lever 21. In that case, the pivotal lever 27 will be omitted, or will be arranged to cause the connection hole 25 to be opened or closed in accordance with pressure with the help of a governor mechanism.

Second Embodiment

This embodiment is a modified example of the first embodiment, and is illustrated in FIGS. 5 and 6. This example relates to a safety device arranged such that a pull-tab is opened in conjunction with an ignition operation, thereby rendering a container to be heated unsealed.

A container to be heated 6 in this embodiment is provided with a pull-tab 6a located at the center of a lid 6b of a container body 6c. A burner 10 and a fuel tank 12 are arranged in the same manner as in the previous embodiment, an ignition means 8 for igniting the burner is provided with an ignition lever 41 that operates a valve mechanism 40 for closing and opening the supply of gas to the burner 10 and also effects ignition. A hole-opening lever 42 is disposed which is connected with this ignition lever 41.

The hole-opening lever 42 has a rod part 42a with its lower end connected to the ignition lever 41 and extending upwards through a gap 4. This rod part 42a is pivotable coupled with a lever part 42c that extends in a direction of the center of the container 6 over the same via an upper end coupling part 42b. A lever-shaped end part 42d of the lever part 42c is interposed between a lower side of the pull-tab 6a and the lid 6b.

With the arrangement of this embodiment, ignition operation caused by the pressing of the ignition lever 41 cause the rod part 42a and the coupling part 42b of the lever part 42c to be pulled downwards. Thereby, the end part 42d causes the pull-tab 6a to be pulled up, and a vent hole is automatically opened together with the ignition operation.

Third Embodiment

This embodiment is a modified example of the first embodiment, and is shown in FIGS. 7 and 8. This example relates to a safety device that renders a container to be heated unsealed by boring a vent hole in a lid 6b together with ignition operation.

As with the previous embodiment, an ignition means 8 in this embodiment is provided with an ignition lever 41 that operates a valve mechanism 40 and effects ignition. A hole-opening lever 44 is disposed which is connected with this ignition lever 41 for boring a hole in a container to be heated 6.

The hole-opening lever 44 has a rod part 44a with its lower end connected to the ignition lever 41 and extending upwards through a gap 4. An upper end part 44b is bent in a direction of the center of the lid 6b above the same. An end part 44c is bent downwards, and is pointed.

With the arrangement of this embodiment, ignition operation caused by the pressing of the ignition lever 41 cause the rod part 44a of the opening lever 44 to be pulled downwards. This causes the end part 44c to pressed against the lid 6b, thereby automatically boring a vent hole.

Fourth Embodiment

Figure 9:
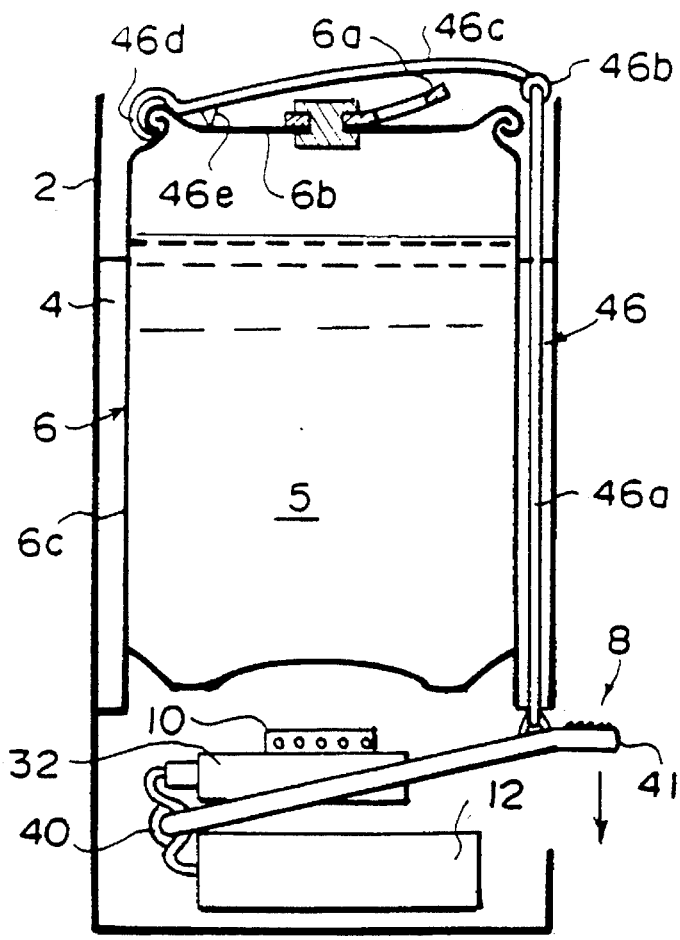
FIG. 9 is a cross-sectional view showing the basic structure of a portable heater equipped with a safety device according to a fourth embodiment of this invention.
Figure 10:
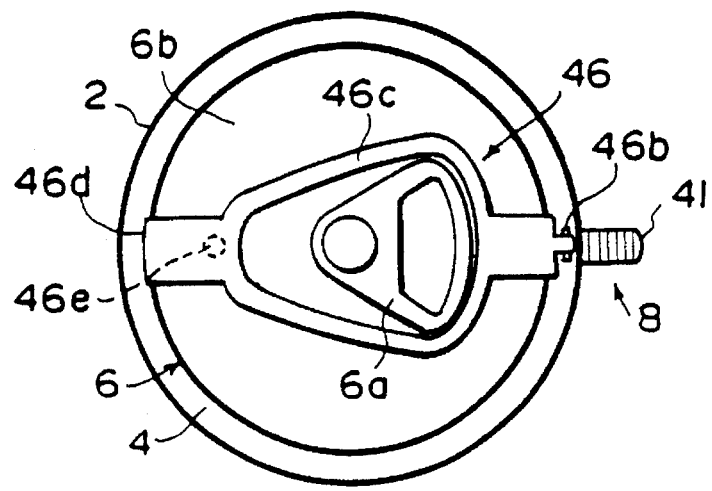
FIG. 10 is a schematic plan view illustrating the portable heater as shown in FIG. 9.

This embodiment is another modified example of the first embodiment, and is shown in FIGS. 9 and 10. This example relates to a safety device that renders a container to be heated unsealed by boring a vent hole in a lid 6b together with ignition operation.

As with the previous embodiment, an ignition means 8 in this embodiment is provided with an ignition lever 41 that operates a valve mechanism 40 and effects ignition. A hole-opening lever 46 is disposed which is connected with this ignition lever 41 for boring a hole in a container to be heated 6.

The hole-opening lever 46 has a rod part 46a with its lower end connected with the ignition lever 41 and extending upwards through a gap 4. A lever part 46c, extending to the opposite end of the container 6 over the same, is connected to the upper end of the hole-opening lever in a pivotable manner via a coupling part 46b. An end part 46d of the lever part 46c is engaged with a joined part between a lid 6b and a container body 6c. A pointed protuberance 46e for boring purposes is formed on the lower surface to the inside of the lever part 46c at a distance from this end part 46d.

With the arrangement of this embodiment, ignition operation caused by the pressing of the ignition lever 41 cause the rod part 46a of the hole-opening lever 46 and the coupling part 46b of the lever part 46c to be pulled downwards. This causes the lever part 46c to rotate around the end part 46d that acts as a fulcrum and, also, the protuberance 46e to be pressed against the lid 6b, thereby automatically boring a vent hole.

In the foregoing embodiments 1 through 4, the design of the ignition levers 21 and 41 can be appropriately changed to a laterally pivotable type as well as a longitudinally pivotable type, a rotatable type, a press type or the like. In response to this, the design of a mechanism for closing and opening the supply of fuel, an ignition mechanism and a link mechanism with the hole-opening levers 22, 42, 44 and 46 are varied.

Fifth Embodiment

Figure 11:
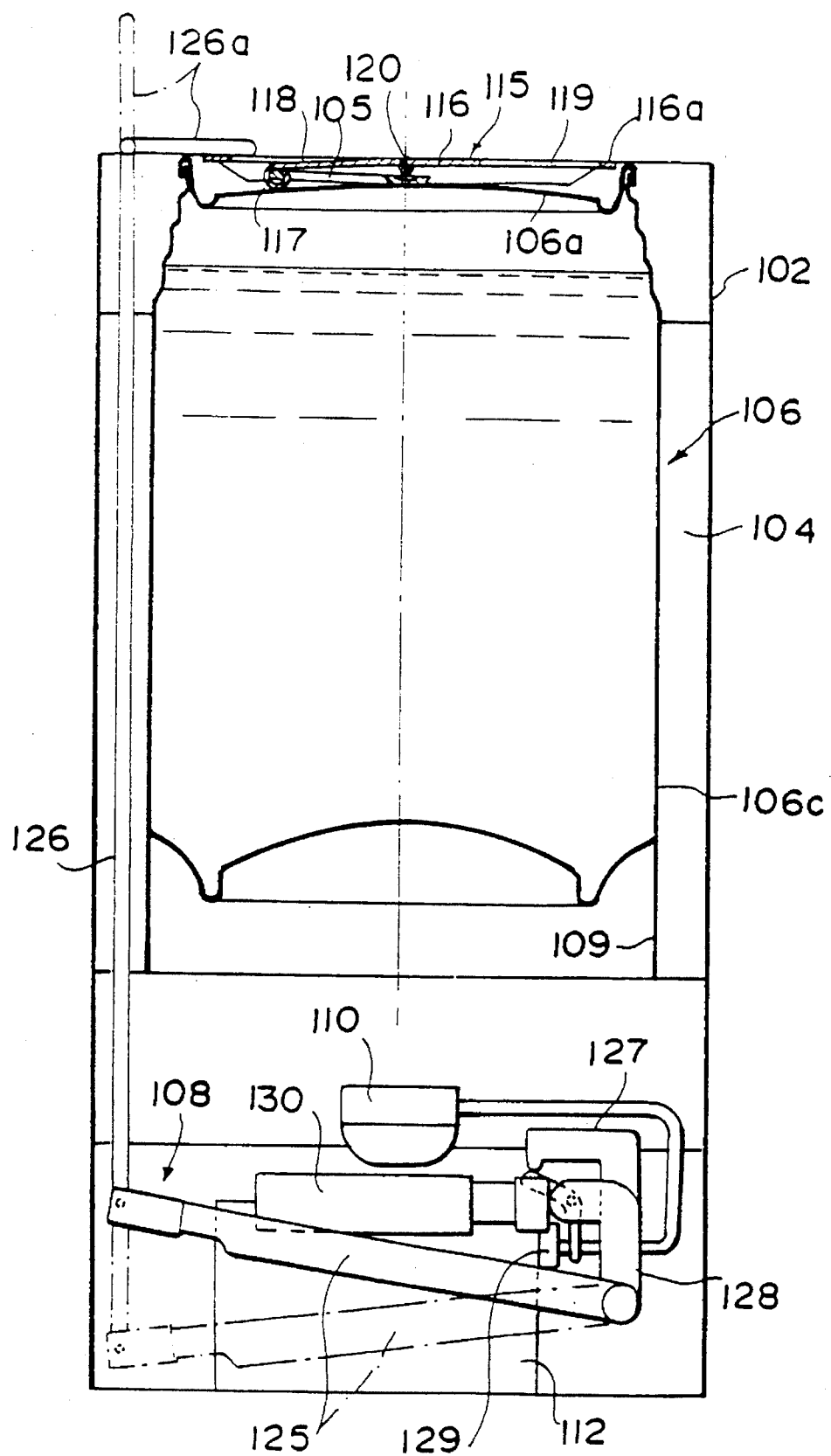
FIG. 11 is a schematic cross-sectional view showing the basic structure of portable heater equipped with a safety device according to a fifth embodiment of this invention.
Figure 12:
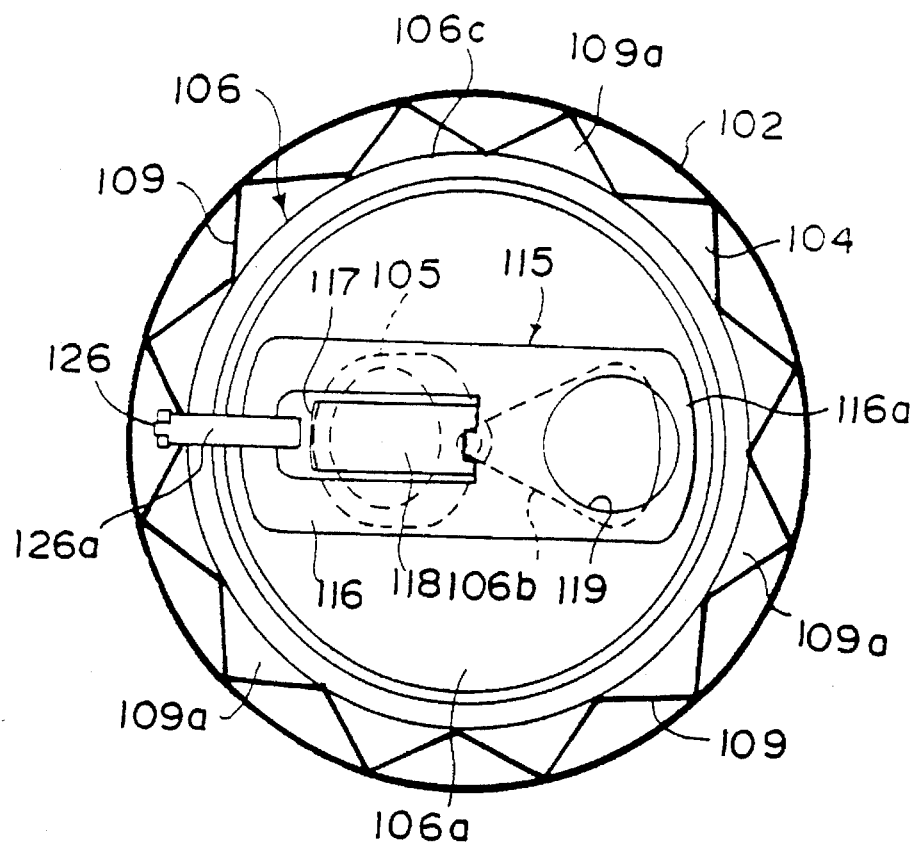
FIG. 12 is a plan view showing the portable heater as shown in FIG. 11.

FIGS. 11 and 12 illustrate a portable heater equipped with a safety device of this embodiment. This embodiment relates to an example of a safety device that enables an ignition operation after a container to be heated having an opening member has been opened, and this avoids heating while the container is sealed.

The portable heater is made up of a cylindrical combustion cylinder 102; a container 106a fixedly housed in an upper inside of this combustion cylinder 102 with a gap 104 formed between the container and the cylinder, and also composed of a cylindrical heat-resistant container body 106c having a lid 106a in which an opening pull-tab 105 is formed on the upper end surface of the lid; a burner 110 fixedly housed within a lower inside of the cylinder 102, and equipped with an ignition means 108; and a fuel tank 112.

The base of the opening pull-tab 105 is fixed to the center side section of an opening flap 106b formed by stamping a cut line on the lid 106a. When a ring portion of the pull-tab 105, extending in a direction opposite to the opening flap 106b, is raised, the center side section of the flap 106b is also raised and separated. Then, a small hole is opened, and the container is also opened. Further raising of the pull-tab 105 causes the pull-tab and the opening flap 106b to be separated from the lid 106a, thereby opening an outlet port for the contents of the container. There is another known structure for the shape of the pull-tab 105 and the flap 106b.

Figure 13:
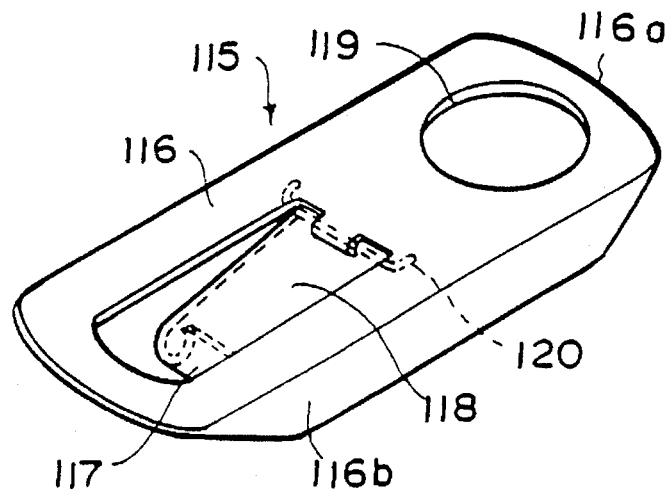
FIG. 13 is a perspective view showing an opening member as shown in FIG. 11.

An opening member 115 that engages with the pull-tab 105 and opens the container by raising the pull-tab 105 is also provided on the top of the lid 106b of the container 106. As shown in FIG. 13, this opening member 115 comprises a lever section 116 which extends in the form of a stick; a connection leaf 118 connected to the lever section 116 and having an engagement section 117 which engages with the pull-tab 105; an operation section 116a formed on one end of the lever for affording a hold for a finger when pull operation is carried out.

Concretely, the lever section 116 is made of a plate member (for instance, a metal plate), and has a length that is slightly shorter than a bore diameter of the upper end outer periphery of the container 106 and a width that is slightly wider than that of the pull-tab 105. Both sides of the opening member are bent downwards to form side walls 116b. Both ends of the opening member are formed into an arc. A circular finger hold aperture 119 is opened in the vicinity of one of the ends, that is, the operation section 116a. In the meantime, the base of the connection leaf 118 is supported in a rotatable fashion by a pin 120 that is arranged at substantially the center position opposite to the operation section 116a and in a direction orthogonal to the longitudinal direction of the operation section. The end of this connection leaf 118 is cylindrically curled to form the engagement section 117. This engagement section 117 engages with the pull-tab 105 in a rotatable fashion. An insertable opening is also formed on the area of the lever 116 that corresponds to the connection leaf 118.

The ignition means 108 of the burner 110 is provided with an ignition lever 125 for supplying gas to the burner 110 and effecting ignition. An operation rod 126 is connected with this ignition lever 125 with one end of the rod projecting upwards along the side of the container 106. The ignition lever 125 is provided with a first arm 127 and a second arm 128, both arms pivotally moving in conjunction with the pivotal operation of the ignition lever. The first arm 127 is caused to be closed and opened in conjunction with a nozzle member 129 of a valve mechanism which controls the supply of gas from the fuel tank 112, whereas the second arm 128 causes a piezoelectric ignition unit 130 to be actuated. The nozzle member 129 is opened and actuated in accordance with the pressing of the ignition lever 125, so that fuel gas is supplied to the burner 110. A discharge voltage is applied from the ignition unit 130 to a non-illustrated discharge electrode, thereby effecting ignition and combustion.

On the other hand, the lower end of the operation rod 126 is connected to the end of the ignition lever 125, and the upper end of the same extends upwards through the gap 104. When the ignition lever 125 is situated at its upper position (a non-operation position), that is, the operation rod 126 locates at its upper position, the end 126a is arranged on the top of the container 106 in a foldable manner. The end 126a is forced to stand upright, namely straight, by means of a non-illustrated spring. A stopper mechanism is also provided to maintain the end in this straight state. When the container 106 is kept in a preserved state, the end 126a of the rod 126 is fixedly folded away on the opening member 115. The thrust of the operation rod 126 connected to the ignition lever 125 causes the ignition operation to be performed.

A triangularly corrugated partition plate 109, which extends longitudinally, is interposed between the combustion cylinder 102 and the container body 106c. The inner wave-shaped spacing 109a of this corrugated partition plate 109 serves as a gap 104 for the updraft of combustion gas.

The operation of the above embodiment will now be described. When the container is in a preserved state as shown in FIGS. 11 and 12, the opening member 115 is mounted flat on the top of the container 106. The engagement section 117 of the opening member engages with the pull-tab 105, and the end 126a of the rod 126 of the ignition means 108 is folded flat and stored.

When the container 106 is heated, the operation section 116a of the lever section 116 of the opening member 115 is raised using the finger hold 119, thereby raising the lever 116. At this time, the end 126a of the rod 126 of the ignition means 108 is released from its fixed state, and hence stands upright.

Figure 14:
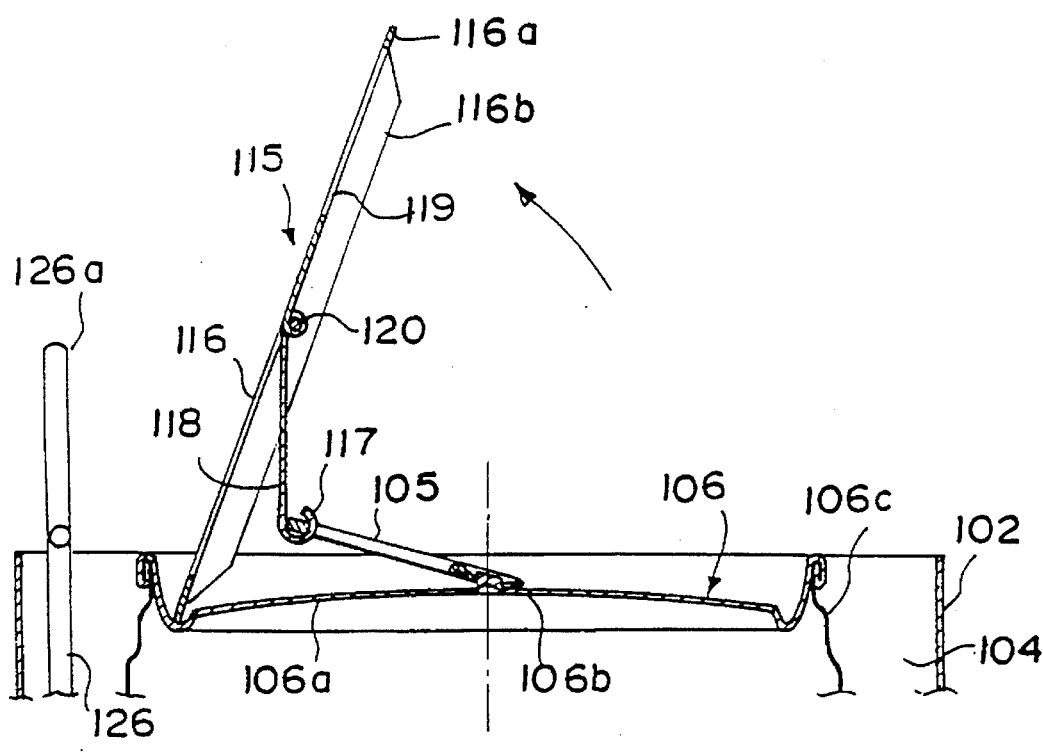
FIGS. 14 to 17 are cross-sectional views of the chief portion of the heater that illustrate opening processes, in sequence, with the use of the opening member as shown in FIG. 13.
Figure 15:
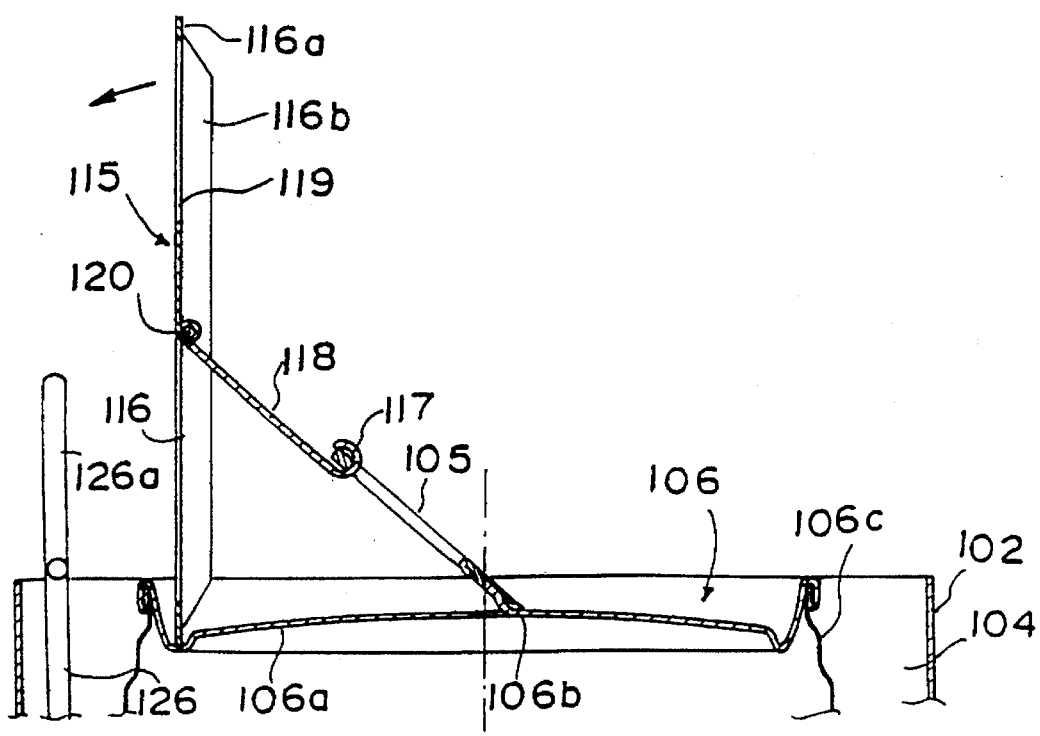
Figure 16:
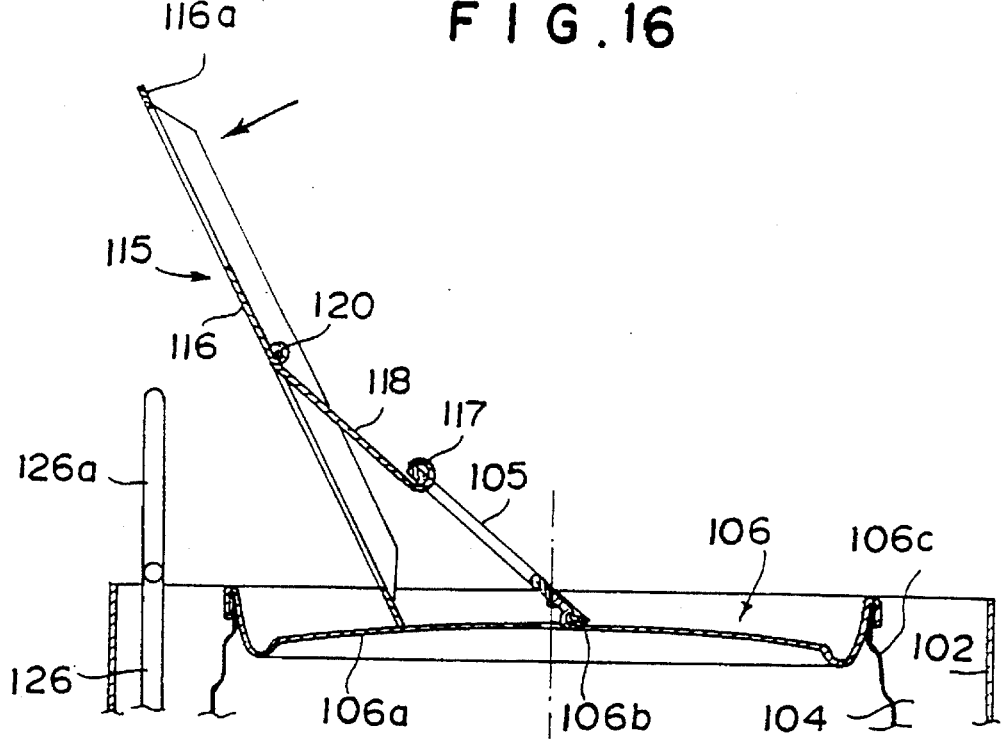

As shown in FIG. 14, further raising of the lever 116 brings its end into contact with the outer periphery of the top surface of the lid 106a, thereby causing the lever to be pivoted around this contacted point. This causes the engagement section 117 of the connection leaf 118 to raise the pull-tab 105, and hence the center of the opening flap 106b is raised, thereby opening a small hole. Subsequently, as shown in FIG. 15, when the lever 116 is raised until it stands substantially upright, the pull-tab 105 is further raised, and the connection leaf 118 comes into line with the pull-tab 105. Thus, both the leaf and the pull-tab become fully extended.

Figure 17:
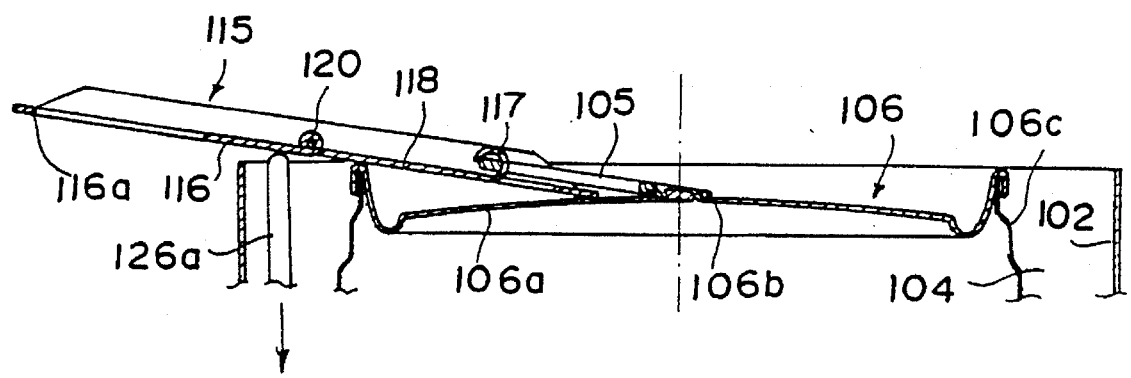

When the lever 116, thus standing upright, is folded away from the container, the lever 116 pivots about a connection point between the connection leaf 118 and the lever, that is, the pin 120. Then, the end of the lever which is opposite to the operating section 116a travels toward the center of the lid 106a over the same. The following half pivotal movement of the lever causes the end 126a of the rod 126 to come into contact with the vicinity of the center on the upper surface side of the lever 116. As shown in FIG. 17, this thrusts the operation rod 126, and the down-thrust of this operation rod 126 causes the ignition lever 125 of the ignition means 108 to pivot, thereby causing gas to be discharged from the burner 110 and to be ignited.

Thus, it is arranged that several operations, namely, the raising of the opening member 115, the raising of the pull-tab 105 and the opening of the container 106 by the hinging of the opening member to the front, and the ignition of the burner 110 are successively and dependently performed, thereby preventing the heating of a container while it is sealed.

Figure 18:
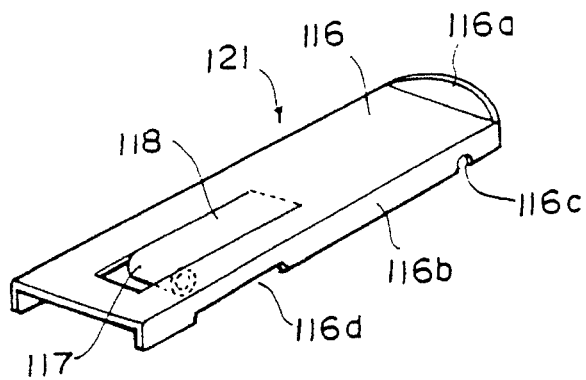
FIG. 18 is a perspective view showing a modified example of the opening member.

FIG. 18 shows a modified example of the opening member of the fifth embodiment. In the opening member 115 of the fifth embodiment mentioned above, the operation section 116a of the lever section 116 is provided with the finger hold aperture 119. In an opening member 121 of this example, one end of the lever 116 is formed to extend outside past the upper edge of the container body 106c, thereby constituting an operation section 116a which has a part, extending from the container body 106c, to be held and raised by a finger from its lower side. Notches 116c to be engaged with the brim of a can are formed on the side walls 116b to the inside of the operation section 116a.

The connection leaf 118 of the lever 116 is formed in the shape of a strip by stamping the lever 116 with nicks. A connection part serves as the center of the pivotal movement of the connection leaf 118, thereby rendering the pin 120 used in the foregoing embodiment unnecessary. The width of the lever 116 is smaller than that of the lever used in the foregoing embodiment, and clearance grooves 116d are formed on the side walls 116b to avoid interference with the pull-tab 105.

Figure 19:
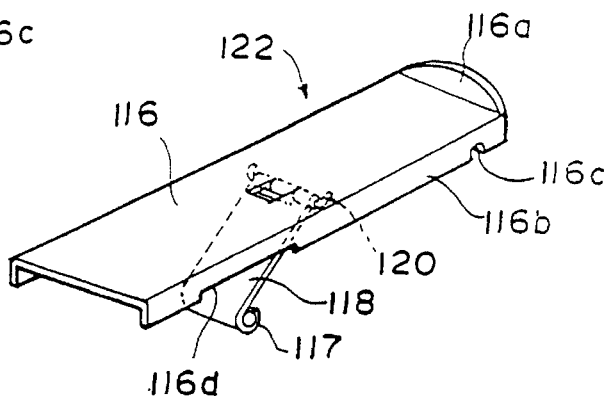
FIG. 19 is a perspective view showing another modified example of the opening member.

FIG. 19 shows another modified example of the opening member. In an opening member 122 of this example, the connection leaf 118 having the engagement section 117 is formed separately from the lever 116. A base of the leaf is connected to, and supported by, the pin 120 in a rotatable fashion at substantially the center of the lever 116 on the rear surface of the same. The rest of the opening member is structurally the same as the member shown in FIG. 18.

Figure 20:
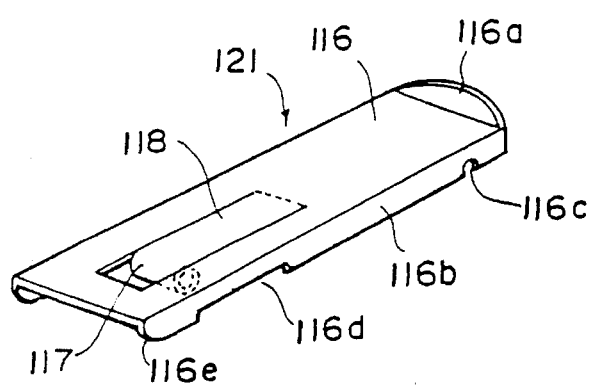
FIGS. 20 to 22 are perspective views showing modified examples of shape of the opening member's end as shown in FIG. 18.
Figure 21:
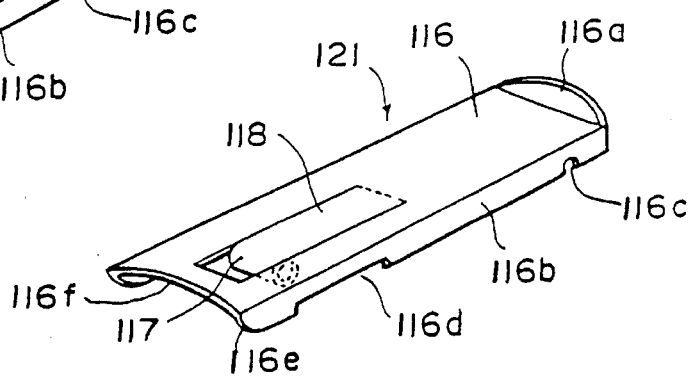
Figure 22:
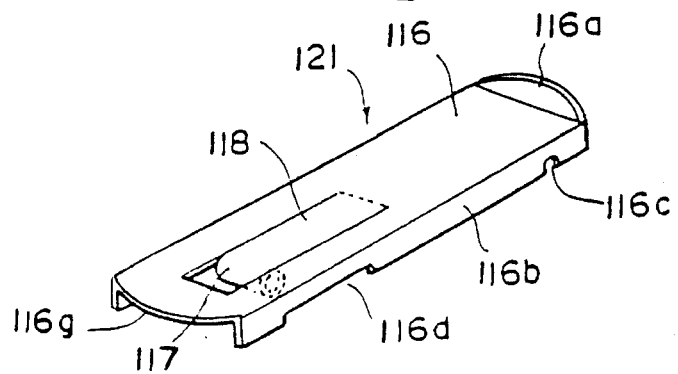
Figure 23A:
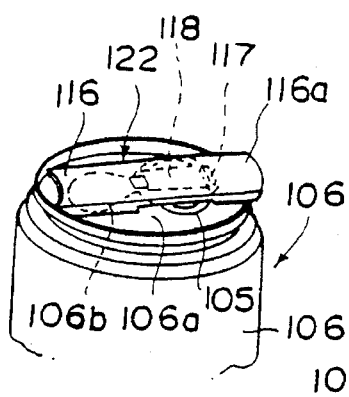
FIGS. 23A–23D are perspective views showing opening processes, in order, when the direction of mounting of the opening member is reversed with respect to a pull-tab.
Figure 23B:
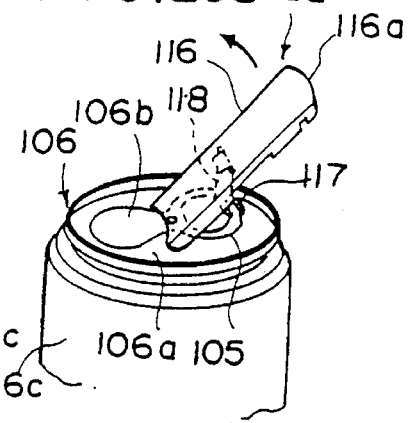
Figure 23C:
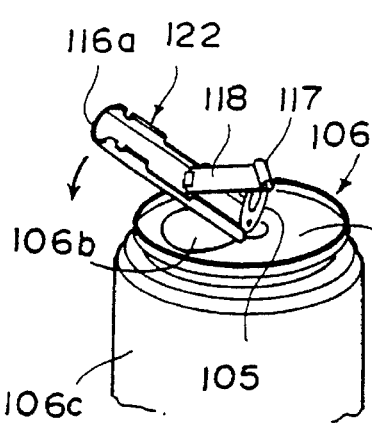
Figure 23D:
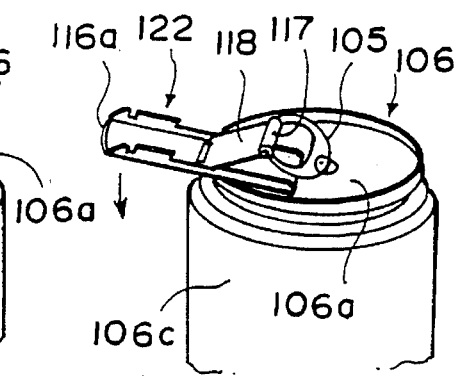

FIGS. 20–22 respectively show modified examples of the shape of the end of the opening member 121 as shown in FIG. 18. In the example shown in FIG. 20, ends 116e of the side walls 116b are rounded. Similarly, in the example shown in FIG. 21, the ends 116e of the side walls 116b are rounded, and the end of the lever 116 is formed into a concavely curved surface 116f. Moreover, in the example shown in FIG. 22, the end of the lever 116 is formed into a convexly curved surface 116g. In any event, the opening member 121 is improved in operability when the member is raised and folded away from the container. The opening member is arranged in such a manner that the engagement of the member with the outer brim of the lid 106a of the container 106 and the sliding of the member over the upper surface of the lid can be improved. Even in other examples, the shape of the end of the opening member can be modified, if necessary.

On the other hand, FIGS 23A–23D show a case where the opening member 122 is attached in a direction, which is opposite to that in the above examples, with respect to the pull-tab 105. The connection leaf 118 is folded away towards the operation section 116a, and then the engagement section 117 engages with the pull-tab 105. As shown in FIGS. 23A–23D, a container is opened by the similar operation to the previous examples, and the ignition operation of a non-illustrated operation rod is carried out. The size of an opening in the container that is made when the opening member 122 is raised becomes large.

Sixth Embodiment

Figure 24:
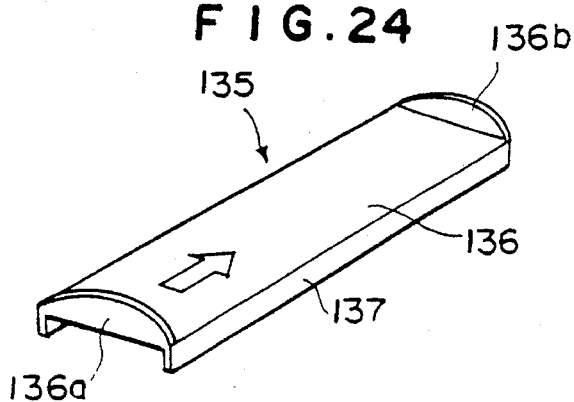
FIG. 24 is a perspective view showing the top surface of an opening member of a safety device according to a sixth embodiment of this invention.
Figure 25:
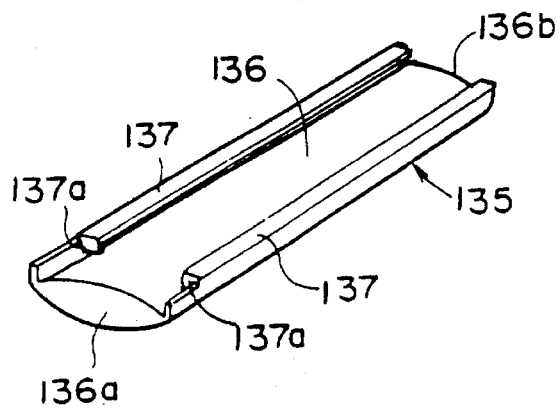
FIG. 25 is a perspective view showing the bottom of the opening member.

This embodiment is a modified example of the fifth embodiment. This embodiment relates to an example of a safety device which enables an ignition operation, as shown in FIGS 26A–26D, after a container to be heated has been opened with the use of an opening member shown in FIGS. 24 and 25.

An opening member 135 of this embodiment engages with the pull-tab 105 in a slidable fashion. The member is made of a plate member (for example, a metal plate). A lever section 136 has a length which is slightly shorter than the bore diameter of the upper end outer periphery of the container 106, and has a width which is slightly wider than that of the pull-tab 105. Both sides of the member are bent downwards to form engagement sections 137. These engagement sections 137 engage with both sides of the pull-tab 105. One end of the engagement sections 137 is left open, and the other end thereof is provided with a removal stopper 137a. Front and back ends of the lever 136 are slightly bent upwards. One end of the opening member where the removal stopper 137a is provided is formed into a thrust section 136a for sliding purposes. The other end of the opening member is formed into an operation section 136b for raising purposes.

Figure 26A:
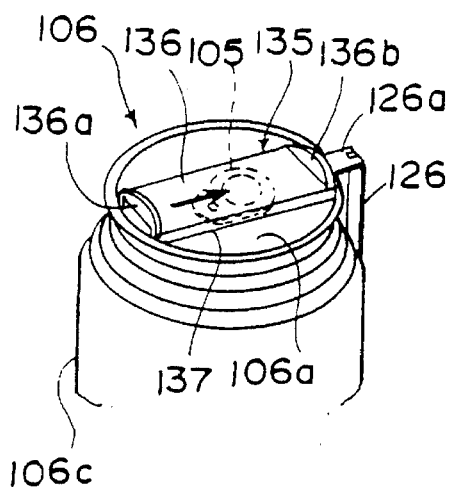
FIGS. 26A–26D are perspective views of the chief portion of the portable heater showing opening processes by means of the opening member as shown in FIG. 24.
Figure 26B:
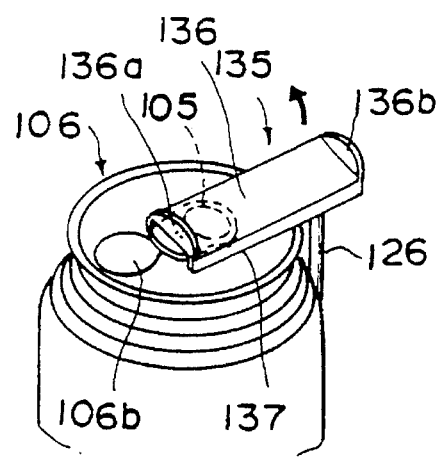

As shown in FIG. 26A, the opening member 135 as set forth above is fitted inside the periphery of an upper part of the container 106 by inserting the pull-tab 105 of the container 106 into the engagement sections 137 from the open side of the opening member (from the operation section 136b), so that the engagement sections engage with the pull tab. The operation rod 126 of the ignition means 108 as constituted in a similar manner to the previous embodiment is disposed so as to locate at an extended part of the operation section 136b of the opening member 135. The end 126a is folded and engagedly inserted between the lower surface of the operation section 136b and the lid.

The operation of this embodiment will now be described with reference to FIG. 26. When the container 106 is heated from its preserved state as mentioned above, the thrust section 136a of the lever 136 of the opening member 135 is slid towards the center when it is pressed. This causes the operation section 136b at one end of the opening member 135 to project outside over the upper brim of the container body 106c. The pull-tab 105 is held at the end of the opening member by means of the removal stopper 137a of the engagement sections 137.

Figure 26C:
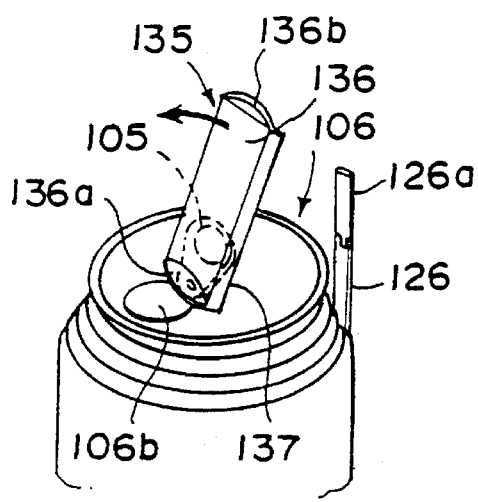
Figure 26D:
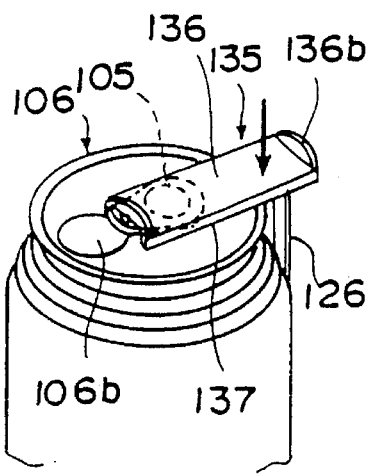

Subsequently, as shown in FIG. 26c, when the lever section 136 starts being raised by pulling the operation section 136b upwards, the pull tab 105 engaging with the other end of the lever is also raised by the engagement section 137. This causes the center of the opening flap 106b to be separated, thereby producing a small hole. At this time, the end 126a of the rod 126 of the ignition means 108 is disengaged from the opening member 135, and hence stands upright.

After the container body 106c has been opened, the opening member 135 is horizontally pressed down in a manner opposite to the previous procedures. This brings the back surface of the lever 136 into contact with the end 126a of the rod 126. The thrust of this operation rod 126 causes the ignition lever 125 of the ignition means 108 to pivot in accordance with the pressing of this operation section 126b, thereby causing gas to be discharged from the burner 110 and ignited.

As mentioned above, the raising of the pull tab 105, the opening of the container 106 and the ignition of the burner 110 are successively and associatedly carried out by the sliding, raising and returning of the opening member 135, thereby preventing the heating of the container while it is sealed.

Seventh Embodiment

Figure 27:
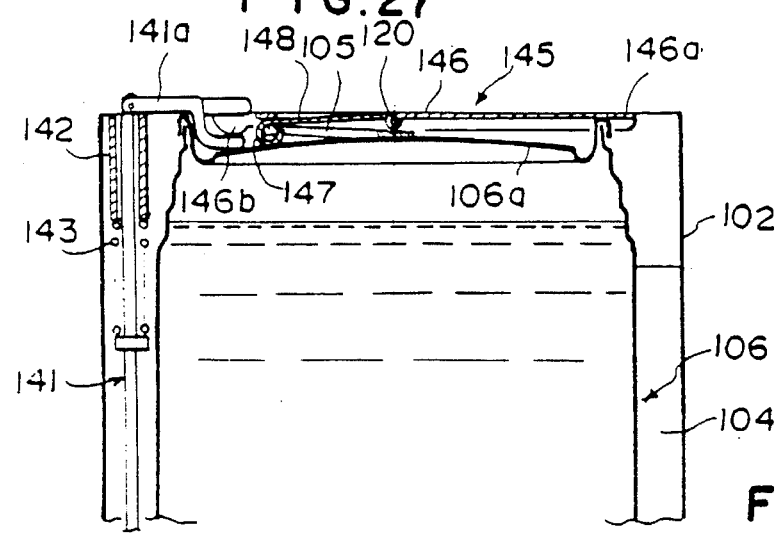
FIG. 27 is a schematic cross-sectional view showing the chief portion of a portable heater equipped with a safety device according to a seventh embodiment of this invention.
Figure 28:
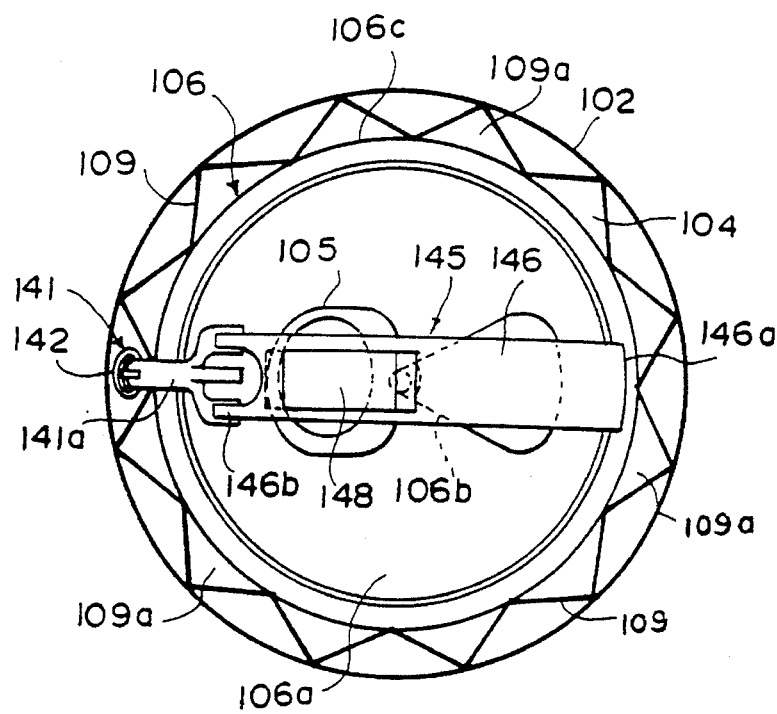
FIG. 28 is a plan view showing the portable heater as shown in FIG. 27.
Figure 29:
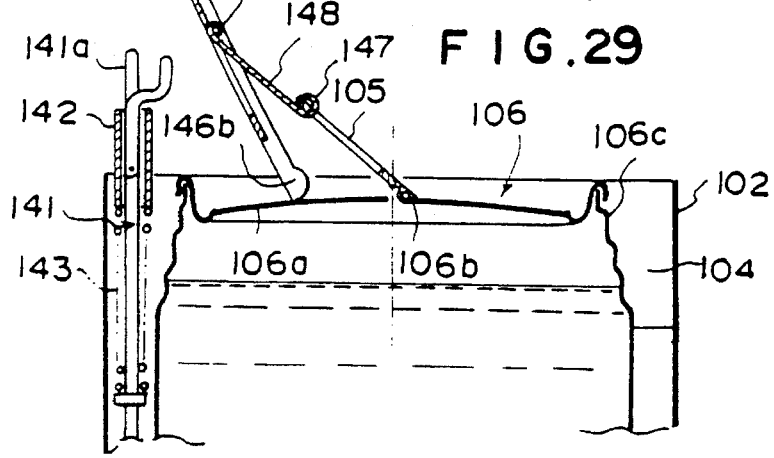
FIG. 29 is a cross-sectional view of the chief portion of the heater illustrating opening processes as shown in FIG. 27.
Figure 30A:
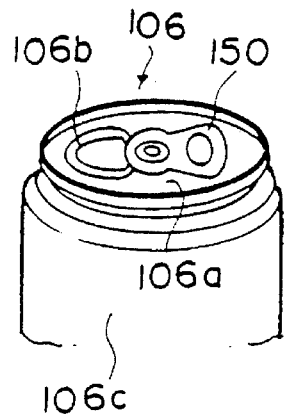
FIGS. 30A–30D are perspective views of the chief portion of the heater showing opening processes of another example of a pull-tab in sequence.
Figure 30B:
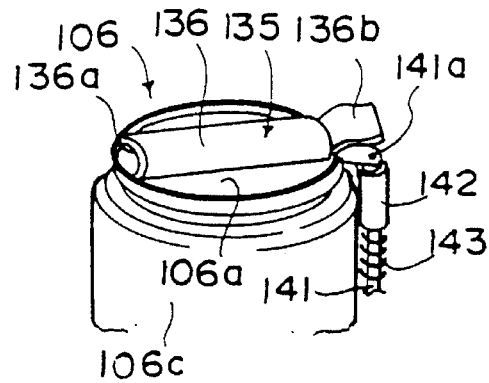
Figure 30C:
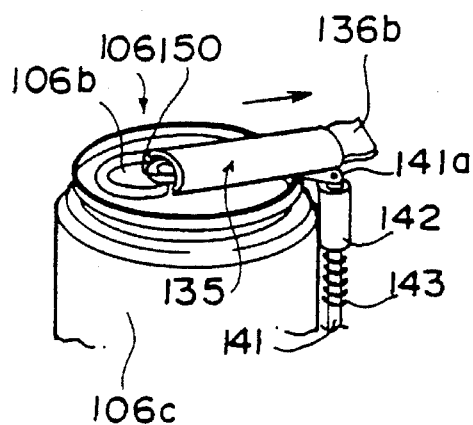
Figure 30D:
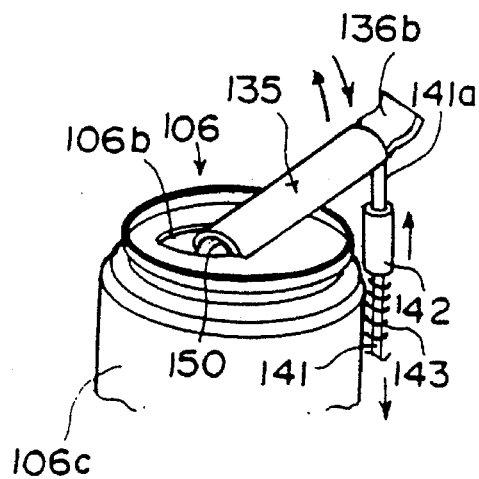

This embodiment is another modified example of the fifth embodiment, and is shown in FIGS. 27 to 29. This embodiment relates to an example having a different link structure disposed between the opening member and the operation rod.

An opening member 145 of this embodiment has a lever section 146. A connection leaf 148 is connected to the lever section 146 by a pin 120 in a rotatable fashion, and an end engagement section 147 of the leaf engages with a pull tab 105. One end of the lever section is formed into an operation section 146a. An end foldable section 141a of an operation rod 141 is disposed in a foldable fashion around a fulcrum. Bifurcated ends of the foldable section are bent downwards, and held below an end 146b of the lever 146 that is opposite to the operation section 146a. A sleeve 142 is fitted around the shaft of the operation rod 141, and is forced upwards by means of a spring 143 disposed below the sleeve. This sleeve 142 causes the end foldable section 141a to stand and be held upright.

In other words, when the operation section 146a of the opening member 145 is pivoted so that it can be raised from its folded state as shown in FIGS. 27 and 28, the container is opened by raising the pull-tab 105 in a similar manner to the previous embodiments. Accordingly, as the end 146b of the opening member travels towards the center over the lid 106a, the end 146b is disengaged from the foldable section 141a of the operation rod 141. As shown in FIG. 29, the elevation of the sleeve 142 owing to the spring 143 causes the foldable section 141a to stand upright. The sleeve 142 is positioned around the outer periphery of the fulcrum of the rod, thereby maintaining the foldable section 141a in an upright state. Further folding of the opening member 145 causes the operation rod 141 to be pressed, thereby effecting ignition.

FIGS. 30A–30D show an example of the opening of a container to be heated which is arranged in such a manner that a pull-tab, as employed in the fifth–seventh embodiments, is not separated from a lid. In this embodiment, the opening member 135 (which is slightly different in structure from the original.) of the sixth embodiment is used. Namely, a pull-tab 150 of this embodiment is arranged in such a way that the tab is once raised to open an opening flap 160b, and then the tab 150 is horizontally folded. The opening member 135 is slid and engaged with the pull-tab 150. The end 141a of the operation rod 141 is folded flat and held between the rear side of the operation section 136b of the lever 136 and the lid while the end engages with the operation section (see FIG. 30B). The opening operation of the container is the same as the container as shown in FIG. 26. The container is opened by raising the operation section 136b, and hence the end foldable section 141a of the operation rod 141 is disengaged from the operation section, and stands upright. Simultaneously, ignition is effected by the following thrust of the foldable section to a horizontal level.

Eighth Embodiment

FIGS. 31 to 34 show portable heaters equipped with a safety device according to this embodiment. This embodiment relates to an example of an extinguished-flame safety device which prevents the emission of unburnt gas if flames go out during combustion.

A portable heater is made up of: a cylindrical combustion cylinder 202; a container to be heated 206 fixedly housed within an upper part of this combustion cylinder 202 with a gap 204 formed for the updraft of combustion gas, and made of a cylindrical heat-resistant can body 206c in which an opening pull-tab 205 is formed on the upper end surface of a lid 206a; and a heating equipment 207 fixedly housed within a lower part of the cylinder 202. The heating equipment 207 comprises a burner 210 provided with an ignition means 208; a fuel tank 212; and an extinguished-flame safety device 215 (see FIG. 33).

The ignition means 208 is provided with an ignition lever 218 for causing gas to be supplied to the burner 210 and ignited. The ignition lever 218 has a pair of lever sections 218a extending on both sides of the fuel tank 212. The one end of the lever is pivoted by a rotating shaft 219, and the other end thereof is connected to an operation section 218b in front of a panel 220. The ignition lever is arranged so as to be pivoted in accordance with the pressing of the operation section 218b. A first arm 221 and a second arm 222, both rotating in accordance with the pivotal movement of the ignition lever 218, are attached to the rotating shaft 219. The first arm 221 is connected to a valve mechanism 24 for regulating the supply of gas from the fuel tank 212, and causes the valve to be opened and closed. The second arm 222 actuates a piezoelectric ignition unit 225. The second arm causes the valve mechanism 224 to be opened upon pressing of the ignition lever 218 and, hence, fuel gas to supply to the burner 210. A discharge voltage is applied from the piezoelectric ignition unit 225 to a non-illustrated electrode, thereby effecting ignition and combustion.

Meanwhile, as shown in FIGS. 35A–36B, the extinguished-flame safety device 215 is provided with a bimetal member 231. This bimetal member 231 is produced in an inverted U-shape. A fixed section 231a at one shorter end of the member is fixed to the upper end of a support 235 which stands at the side of the ignition lever 218. A displaceable section 231c extends from this fixed section 231a upwards and then downwards via a curved section 231b. A regulation member 232 is connected to the lower end of the bimetal member, wherein the front side of the regulation member progressively protrudes outside in a downward direction, and the lower surface of this regulation member is engageable with the lever section 218a of the ignition lever 218. A release 233 that extends sidewards is disposed at a position opposite to the regulation member 232. This release 233 has a release window 233a.

Figure 33:
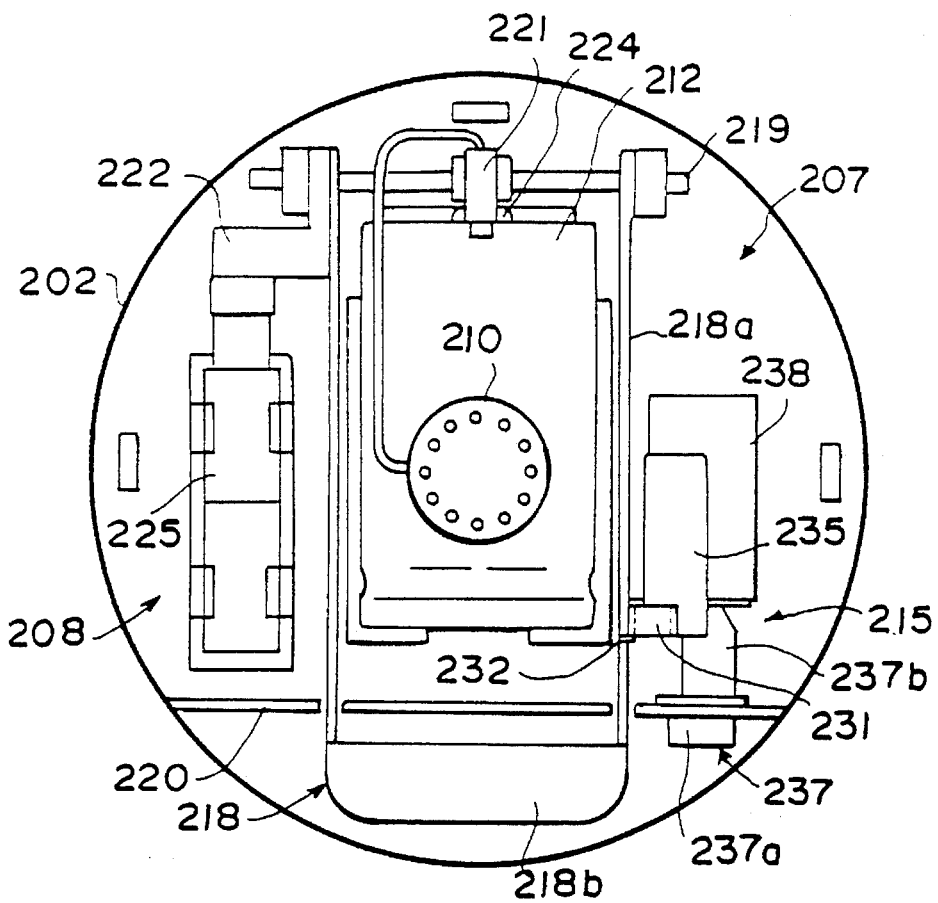
FIG. 33 is a cross-sectional plan view taken along a line A—A as shown in FIG. 31.
Figure 34:
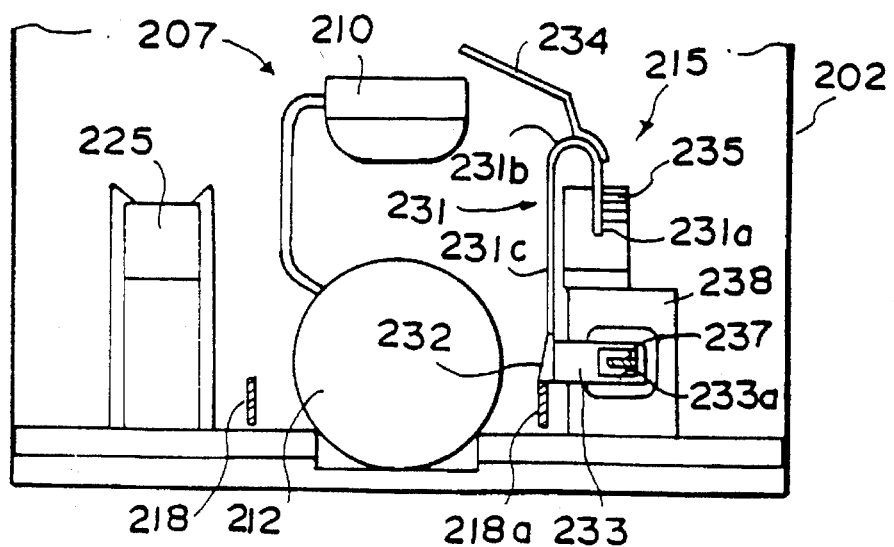
FIG. 34 is a cross-sectional plan view of the chief portion of the heater taken along a line B—B as shown in FIG. 31.

Moreover, the curved section 231b of the bimetal member 231 is connected to a heat-sensitive part 234 (not shown in FIG. 33). This heat-sensitive part 234 is made of metal having a superior heat conductivity. One end of this heat-sensitive part is fixed to the bimetal member 231, whilst the other end thereof extends to the vicinity of the burner 210. Upon receipt of combustion heat produced by the burner 210, the heat-sensitive part transfers heat to the bimetal member 231. It is desirable that the bimetal member 231 should be formed into a multilayer structure, in which members having a high heat conductivity such as copper are laminated at the center of the structure.

When a temperature rises, the bimetal member 231 is displaced in a direction in which a curvature radius of the curved part 231b becomes large. When the bimetal member has thus been thermally displaced, the regulation member 232 moves to a position above the lever 218a of the ignition lever 218. The lower end of this regulation member 232 is set in such a way that the regulation member engages with the upper side of the lever section 218a so as to hold the ignition lever 218 at an ignition position when the ignition lever 218 is situated at a pressed position, that is, an ignition position.

Figure 35A:
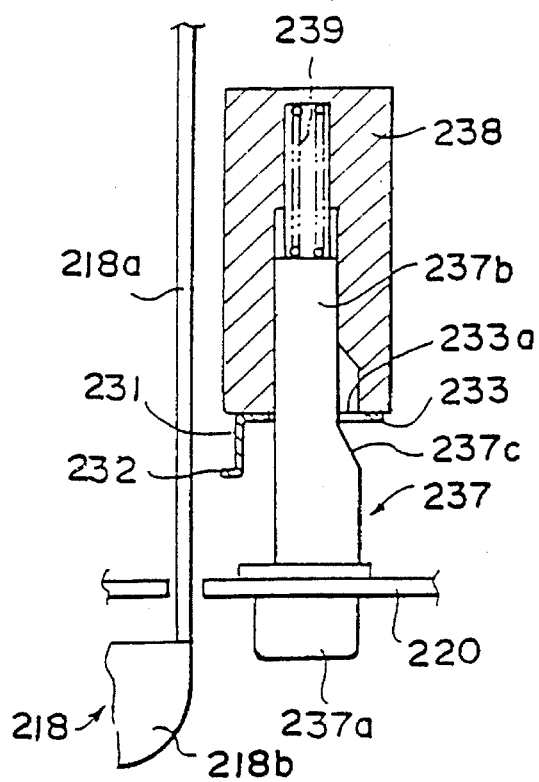
FIGS. 35A–35C are cross-sectional plan views of the chief portion of the heater illustrating operating conditions of the safety device as shown in FIG. 31.
Figure 35B:
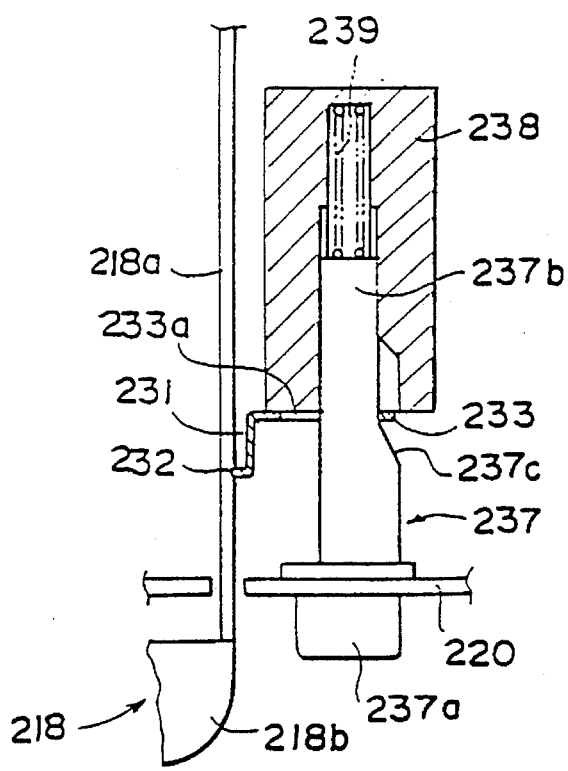
Figure 35C:
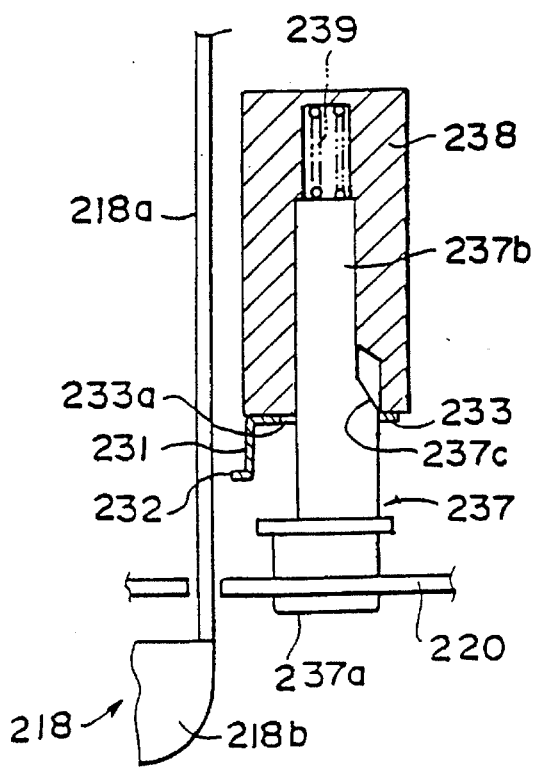

A flame extinguishing section 237 is connected to the release section 233 of the bimetal member 231. As shown in FIGS. 35A–35C, the front portion of this flame extinguishing member 237 is formed into a press-button section 237a. This button section passes through, and is also supported by, the panel 220. A plate section 237b extends rearwardly from the back of this button section, and passes through the release window 233a of the release section 233. The flame extinguishing member 237 is inserted into a holder 238, and is forced in a direction of projection by means of a spring 239 which is interposed between the end of the extinguishing member and the holder. Moreover, a tapered section 237c is formed on one side of the plate section 237b. This tapered section 237c is engaged with the edge of the release window 233a, whereby the regulation member 232 of the bimetal member 231 can be displaced in a receding direction.

As with the previous embodiment, the triangular corrugated partition plate 209 is interposed between the combustion cylinder 202 and a container body 206c. The inner spacing 9a of the corrugations of this partition plate 209 serves as the gap 204 for the updraft of combustion gas.

Figure 36A:
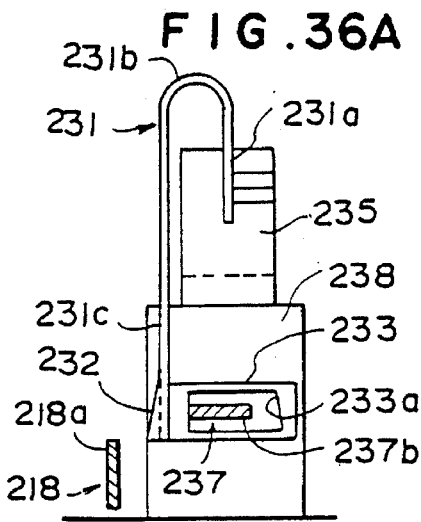
FIGS. 36A and 36B are cross-sectional front view of the chief portion of the heater illustrating operating conditions of the safety device as shown in FIG. 31.

The operation of this embodiment will now be described. When a heater is in an extinguished state, that is, a container is in a preserved state without the operation of the ignition lever 218, the operation section 218b of the ignition lever 218 is situated at its elevated position. The bimetal member 231 is also in a non-deformed state, and the regulation member is positioned at its receded location where it allows the vertical movement of the ignition lever 218. Under such conditions, as shown in FIGS. 35A and 36A, when ignition operation, that is, the depression of the ignition lever 218 is carried out, gas is discharged from the burner 210 and then ignited. In a state immediately after combustion is started, the bimetal still remains intact without an influence of a rise in temperature, and the regulation member 232 locates at its receded position.

Figure 36B:
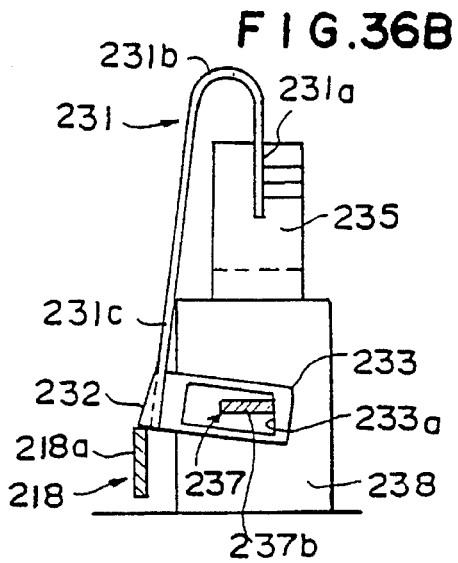

After a predetermined time has elapsed from the start of combustion while the ignition lever 218 is being depressed, upon reception of combustion heat transmitted from the heat-sensitive section 234, the bimetal member 231 is thermally deformed. As shown in FIGS. 35B and 36B, the regulation member 232 is deformed so as to project over the lever 218a of the ignition lever 218. At this time, even when the ignition lever 218 is released, the bottom of the regulation member 232 locks the lever 218a, and prevents the upward return movement of the ignition lever 218, whereby the emission of gas from the burner 210 is maintained, and combustion continues.

If flames are unexpectedly extinguished, during combustion, by wind or the boiling over of the liquid, the bimetal member 231 will be deformed in a receding direction as a result of a drop in temperature. The regulation member 232 is disengaged from the lever section 218a of the ignition lever 218, and the ignition lever 218 pivots and returns in an upward direction. As a result of this, the supply of gas to the burner 210 is interrupted, thereby preventing the emission of gas while the flames are extinguished.

Meanwhile, when flames are extinguished after the heating operation has been completed, the pressing of the press-button 237a of the flame extinguishing member 237 causes the regulation member 232 of the bimetal member 231 to be disengaged from the lever section 218a via the release section 233 by means of the tapered section 237c. Hence, the ignition lever 218 pivots and returns in an upward direction, thereby interrupting the emission of gas and causing flames to be extinguished.

Figure 37A:
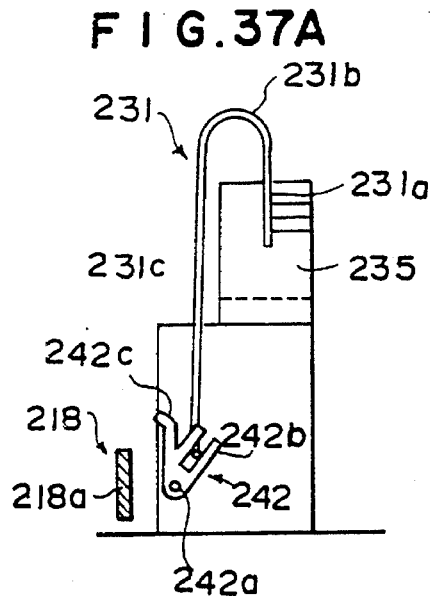
FIGS. 37A and 37B are schematic views showing modified examples of a regulation member.
Figure 37B:
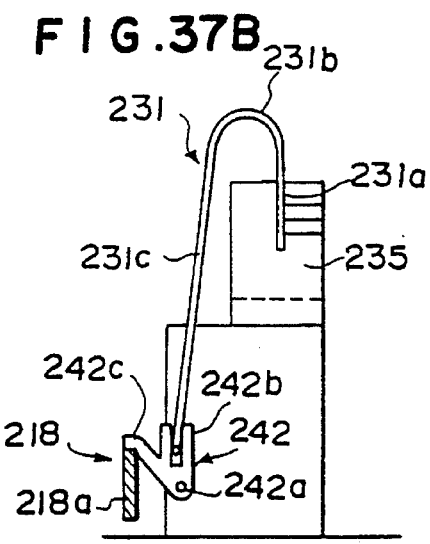

FIGS. 37A and 37B shows a modified example of the regulation member. In the above embodiment, although the regulation member 232 is integrated with the bimetal member 231, a regulation member 242 is independently formed in the form of a V-shaped pivotal arm in this embodiment.

In other words, the regulation member 242 is supported by a pivot 242a in a pivotal manner, and a slit 242b of the regulation member meshes with the end (a pin) of a displacement section 231c of the displaceable section 231c of the bimetal member 231. The regulation member is pivoted from a low temperature state shown in FIG. 37A to a heated state shown in FIG. 37B as a result of the thermal deformation of the bimetal member. The end of a hook 242c moves to a position above the lever section 218a of the ignition lever 218, and engages with this lever section.

In this modified example, a multiplying factor adjustment of the amount of displacement can be carried out by varying a length between the pivot 242a of the regulation member 242 and an engagement position, which makes it possible to increase an operation force.

In the flame extinguishing mechanism shown in FIGS. 37A and 37B, a non-illustrated release section 233 having a release window 233a similar to the previous example may be connected to the bimetal member 231, and the mechanism may be arranged so as to be actuated by the operation of the flame extinguishing operation member 237 having the press-button 237a. Moreover, a flame extinguishing operation member may be arranged such that an arm of the regulation member 232 is rotated directly in an extinguishing direction.

Figure 38:
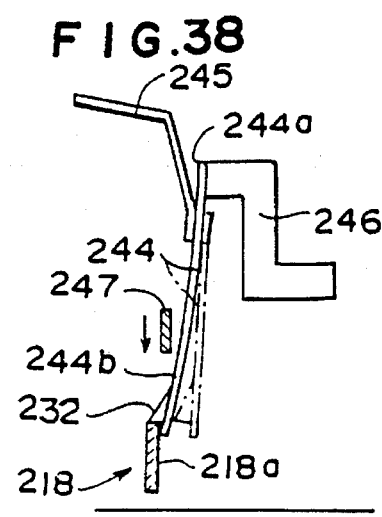
FIG. 38 is an schematic view showing a modified example of a bimetal member.

FIG. 38 shows a modified example of a bimetal member. A bimetal member 244 of this example is linear, and the upper end 244a of this member is fixed to a support 246. A heat-sensitive section 245 is connected to this upper end 244a, and the lower end 244b is deformed and warped towards the ignition lever 218 resulting from a rise in temperature of this heat-sensitive section. As with the previous example, the regulation member 232 is formed on the lower end 244b to stop the lever section 218a of the ignition lever 218.

The flame extinguishing member 247 is constituted into a lever which is vertically operated. When the ignition lever 218 is held by the regulation member 232, the pressing of the flame extinguishing member 247 causes the lower end 244b of the bimetal member 244 to recede, whereby the regulation member 232 is disengaged from the lever. This flame extinguishing member 247 may be constituted in the same manner as in the previous example, or the structure of this example may be applied to the previous example.

Figure 39:
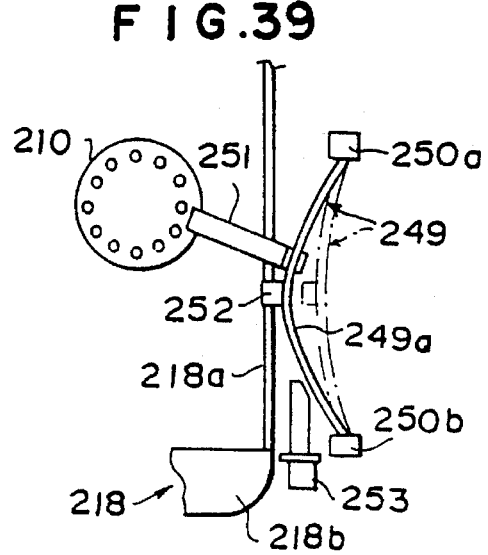
FIG. 39 is an schematic view showing a modified example of a bimetal member.
Figure 45:
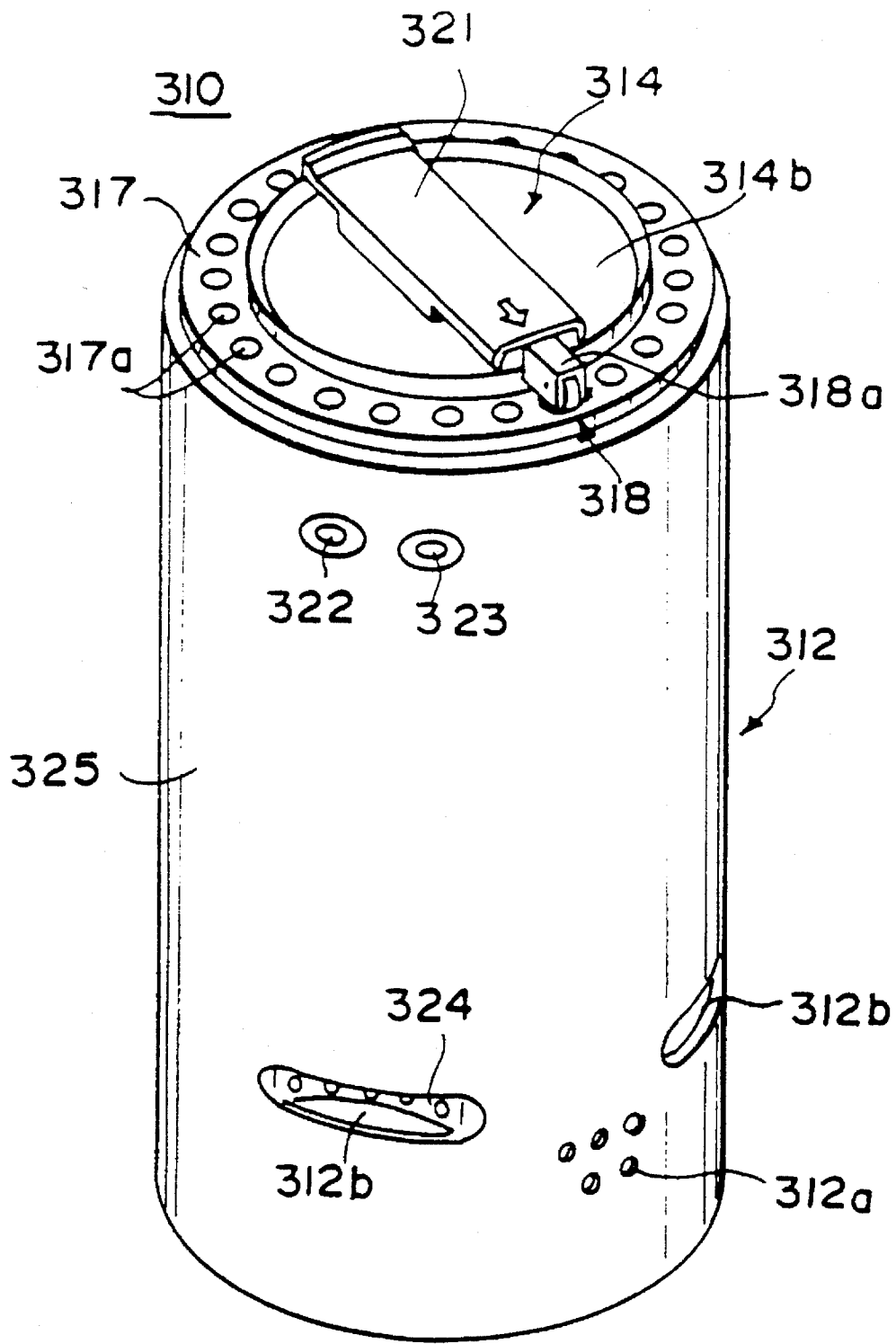
FIG. 45 is an appearance perspective view showing a portable heater equipped with a safety device according to a tenth embodiment of this invention.
Figure 46:
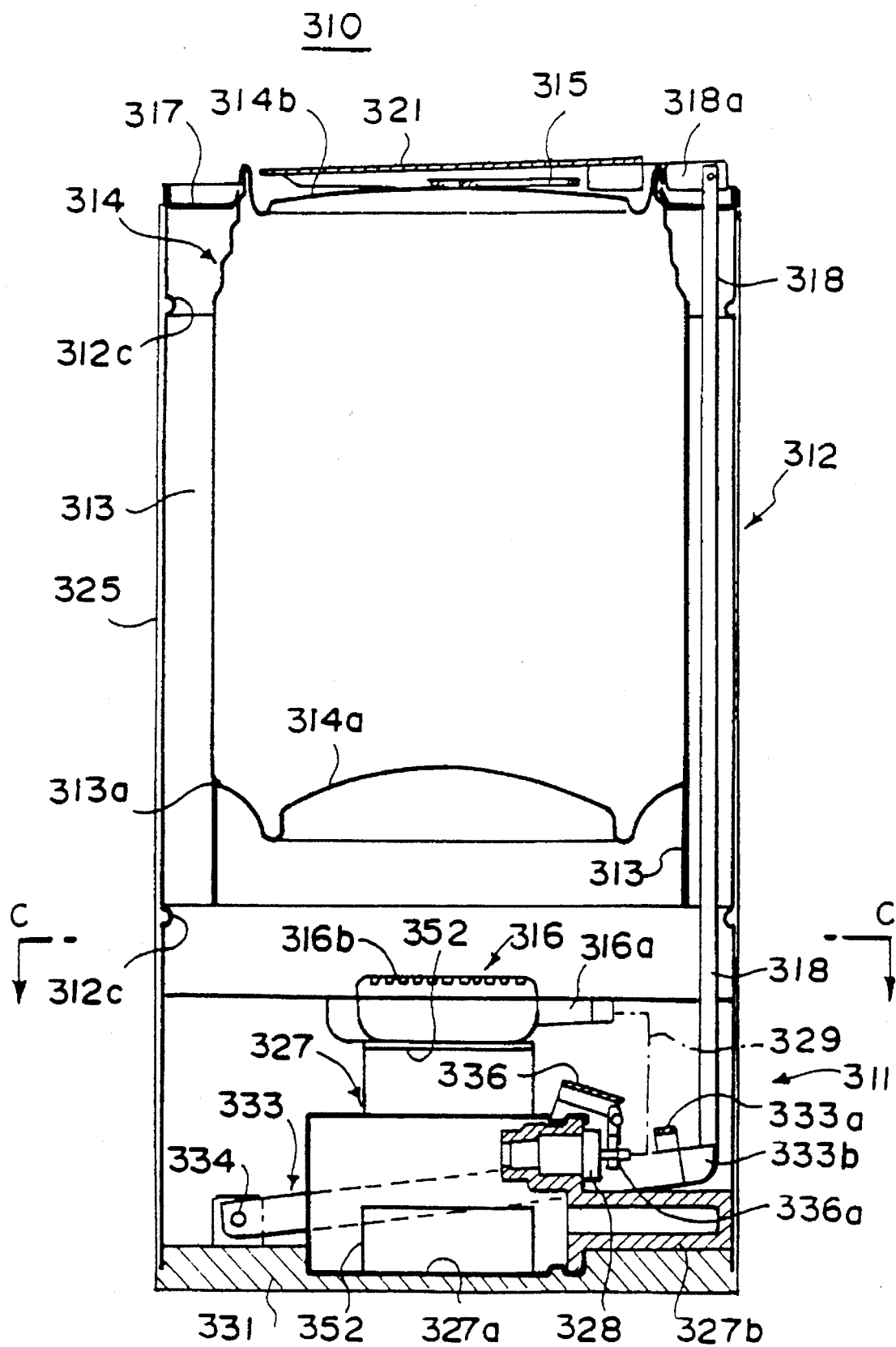
FIG. 46 is a side elevation view, partly in section showing the basic structure of the heater as shown in FIG. 45.
Figure 47:
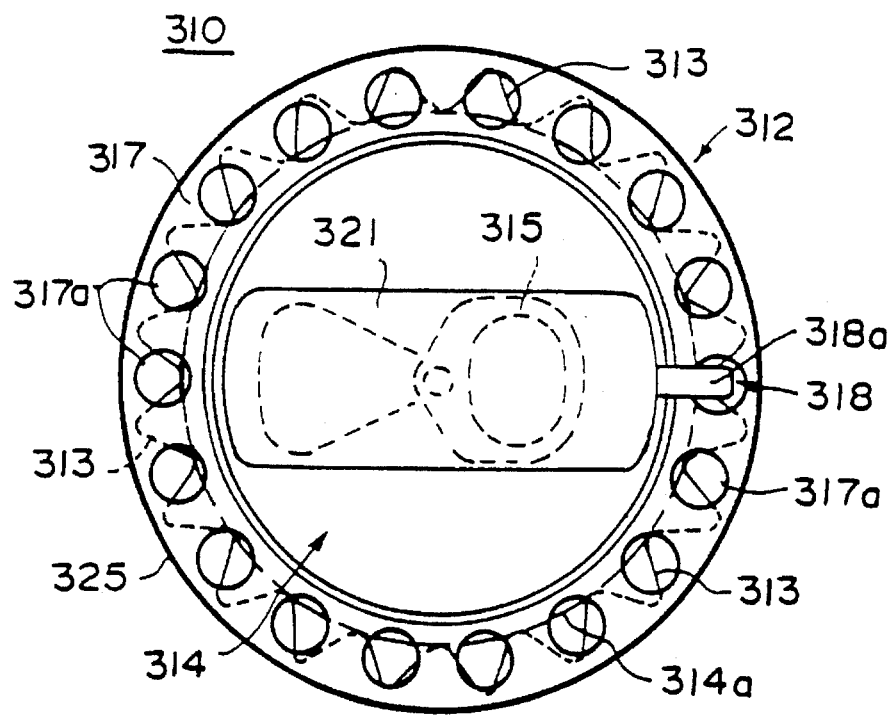
FIG. 47 is a plan view of the heater as shown in FIG. 46.
Figure 48:
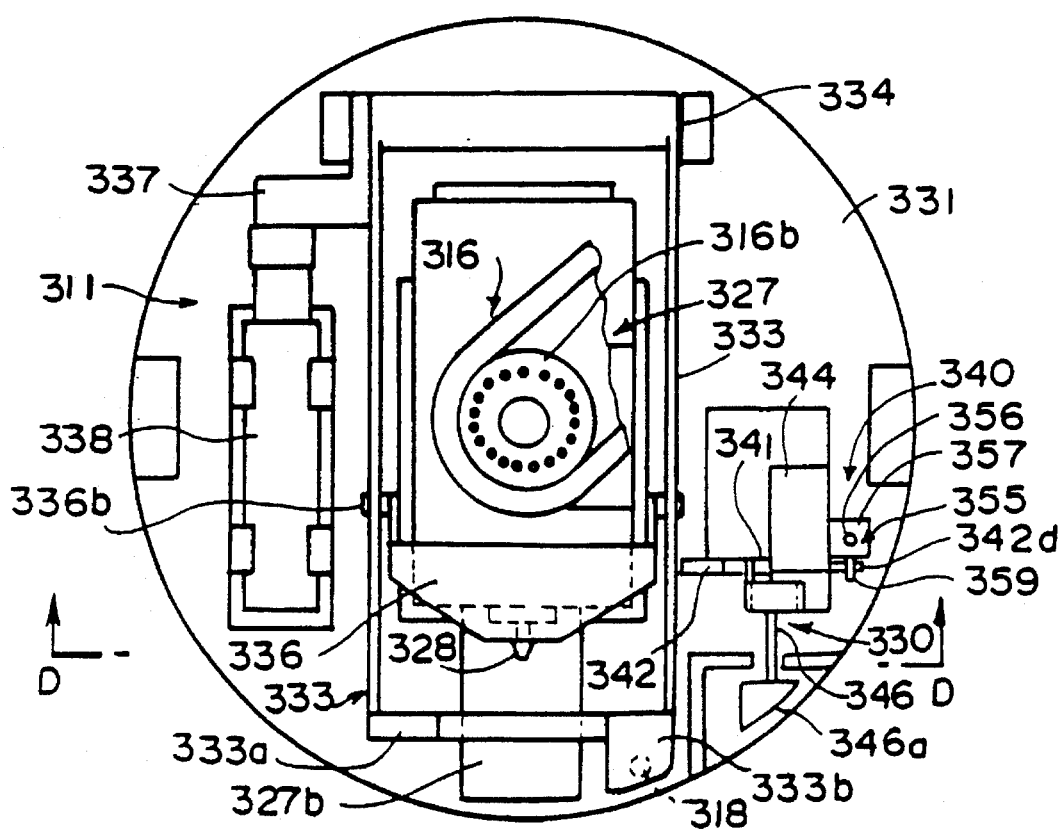
FIG. 48 is a cross-section view of the chief portion of the heater taken along a line C—C as shown in FIG. 46.
Figure 49:
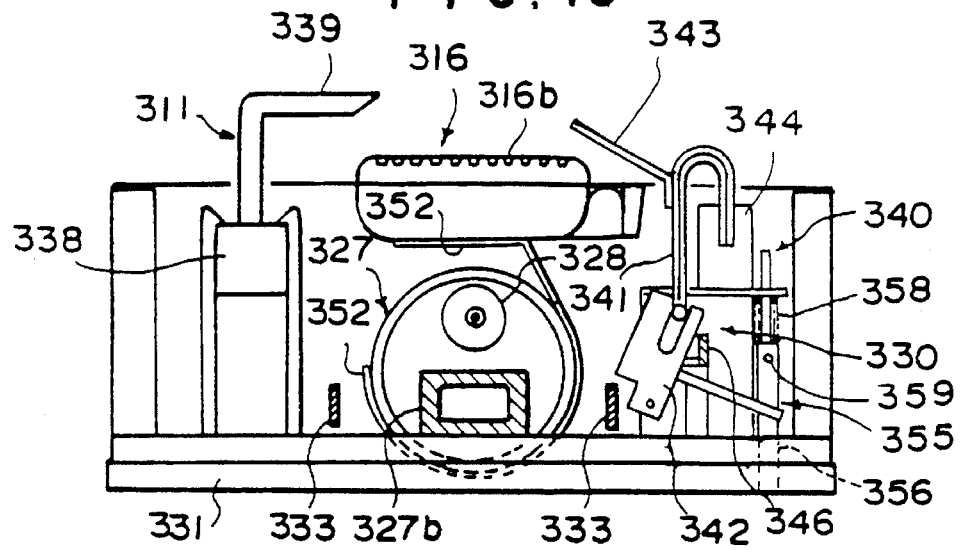
FIG. 49 is a partial cross-sectional plan view taken along a line D—D as shown in FIG. 48.
Figure 50:
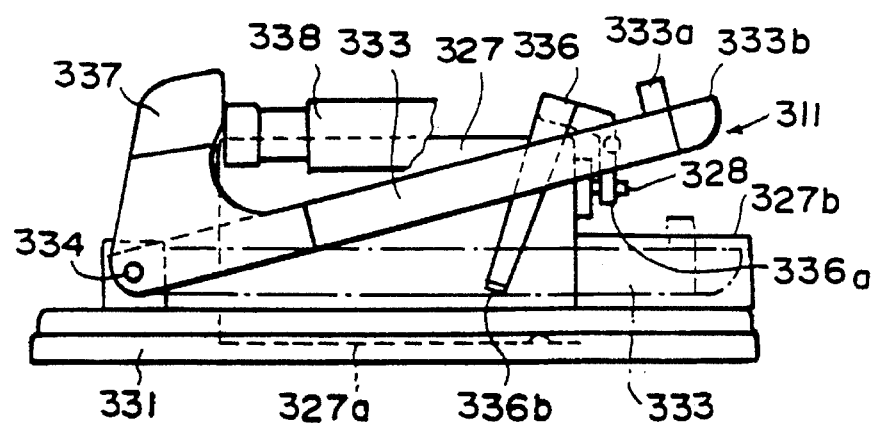
FIG. 50 is a side elevation view of the chief portion of the heater as shown in FIG. 48.

FIG. 39 shows another modified example of a bimetal member. In this example, a bimetal member 249 stands restricted, at one end thereof, by means of a support section 250a and is supported, at the other end thereof, by a slidable support section 250b. A warp of this slidable support causes a center 249a to advance or recede. A heat-sensitive section 251 is connected with this center 249a, and a regulation member 252 is formed which holds the lever section 218a of the ignition lever 218. A flame extinguishing member 253 is formed in such a way that the pressing of this member causes the bimetal member 249 to directly recede.

In this example, the deformed stress of the bimetal member 249 is large, and hence this should preferably be applied to a mechanism which requires a large operation force.

FIG. 40 shows an example in which a link mechanism 256 is arranged for switching a display of a combustion display 255 formed on a panel 220 in accordance with the thermal deformation of the bimetal member 231 used in the example shown in FIG. 33.

Namely, one end of the link mechanism 256 is engaged with the bimetal member 231, and the link mechanism is made up of a pivotal arm 257 which moves in a pivotal manner in accordance with the thermal deformation of the bimetal member.

Specifically, one end of the link mechanism 256 is connected to the bimetal member 231, and is made of a pivotal arm 257 which causes pivotal movement as a result of the thermal deformation of the bimetal member. An indication plate 258 is connected to the end of the pivotal arm 257. The sliding of the indication plate 258 causes the display of the opening 220a of the combustion display section 255 to be switched.

FIGS. 41A and 41B shows another embodiment of a link mechanism for switching an indication of the combustion display section 255. In other words, a link mechanism 260 is made up of a pivotal lever, and an indication plate 260a is integrated with the end of the link mechanism in a bent fashion. A base 260b is rotatably supported by the support 235 that supports the bimetal member 231. The engagement member 236 formed on the deformable end of the bimetal member 231 engages with a part of the link mechanism 260. The link mechanism 260 is pivoted in accordance with the thermal deformation of the bimetal member 231 from its cold state as shown in FIG. 41A to a heated state as shown in FIG. 41B. This causes the indication plate 260a to appear in the opening 220a of the indication section 255.

As the ignition means of the portable heater, according to the eighth embodiment, a mechanism in which the ignition lever is laterally pivoted may be appropriately adopted in addition to the press type ignition lever as set forth above. In response to this, the design of the heater should be changed such that the regulation member which travels as a result of the deformation of the bimetal member engages with the ignition lever.

Ninth Embodiment

FIGS. 42 and 43 show a portable heater equipped with a safety device according to this embodiment. This embodiment relates to an example of a safety device which provides ignition recognition and an indication of a rise in surface temperature.

Figure 31:
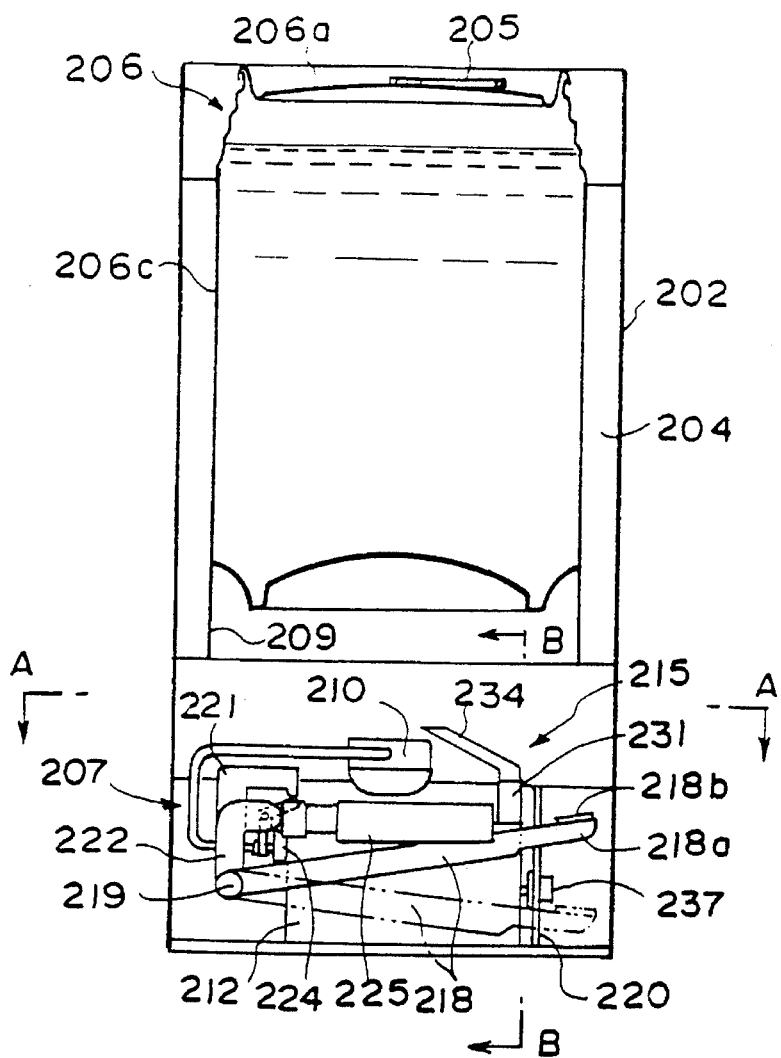
FIG. 31 is side view partly in section showing the basic structure of a portable heater equipped with a safety device according to an eighth embodiment of this invention.
Figure 32:
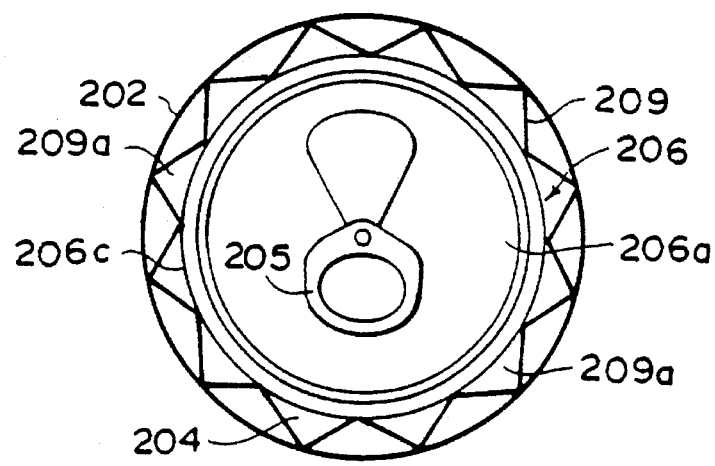
FIG. 32 is a plan view illustrating the heater as shown in FIG. 31.

This example has an internal structure which is similar to the portable heater as shown in FIG. 31 of the eighth embodiment (the extinguished-flame safety device can be disregarded). A temperature display unit 211 is disposed as a safety device on the surface of the portable heater. Practically, as shown in FIG. 31, the portable heater comprises: the fuel tank 212 filled with fuel; the burner 210 which causes gas supplied from the fuel tank 212 to be ignited; the ignition lever 218 which causes gas to be ignited and extinguished; the container to be heated 206 which is disposed over the burner 210; and the cylindrical combustion cylinder 202 made of a metal material having a superior heat conductivity, such as aluminum, for holding the container 206.

The container 206 held by the combustion cylinder 202 is disposed over the burner 210. The pull-tab 205 for opening purposes is formed on the upper end surface of the container 206. Substances to be heated, such as water, noodles, soup or the like, are sealed in the container. As shown in FIG. 43, the metal partition plate 209 (a corrugated plate) is fixed in a gap between the container 206 and the combustion cylinder 202 over the entire periphery of the container. This plate forms a number of channels 209a on the container side of the plate. A heat-insulating corrugated plate 213 having small pitches such as a corrugated board covers the external periphery of the combustion cylinder 202, and a heat insulating member 214 such as paper and expanded styrol further surrounds the surface of this corrugated plate.

As shown in FIG. 42, a window 226 for verifying the amount of gas remaining in the fuel tank 221 and a window 227 for extinguishing flames by moving the ignition lever 218 to an extinguishing position when the contents of the container 206 are heated to a predetermined temperature are defined on a lower part of the heat-insulating member 214. A plurality of slot-shaped air intakes 228 are defined for supplying air to the gas during combustion. The temperature display unit 211 is positioned on an upper part of the heat-insulating member 214.

The display unit 211 is made of a thermo-tape for managing a temperature that is used for verifying ignition and handling the heater. A circular aperture 266 is bored on an upper part of the heat-insulating member 214, and this aperture allows the visual verification of, for example, a thermo-color of a thermo-tape 265 used for verifying ignition. That tape is attached to the surface of the combustion cylinder 202, and undergoes discoloration at a temperature of about 50° C. A frame 267 having the same color as a thermo-color of the tape 265 that has undergone discoloration is printed in such a manner as to surround the aperture 266. Letters which can be read "Verify Ignition" are printed below the frame 267. A circular thermo-tape 268 used for handling the heater which undergoes discoloration at temperatures ranging from 80°–100 ° C. is attached to the surface of the heat-insulating member 214 at substantially the same height as the aperture 266. A frame 269 having the same color as the tape 268 that has undergone discoloration is printed in such a manner as to surround the tape 268, and letters which can be read "Caution ! Hot" or "Handle Carefully !" are printed below the frame 269.

The thermo-tape 268 for handling purposes may be attached to a position above the air intake ports 228. The thermo-tape is not limited to a circle, but may be formed into a rectangle or the like.

The operation of the temperature display unit 211 of the portable heater having the foregoing structure will now be described.

When the ignition lever 218 is pressed, the valve mechanism 224 is opened and closed, and gas is supplied from the fuel tank 212 to the burner 210. In addition to this, the piezoelectric ignition unit 225 is struck, and sparks are produced between the burner 210 and the discharge electrode 234, whereby gas which is discharged from the burner 210 is ignited. Hot air produced by the combustion of gas heats the underneath of the container 206. The hot air also rises along the channels 209a formed on the container side of the partition plate 209, thereby rapidly heating the container, wherein the partition plate extends downwards past the bottom edge of the container 206 and is exposed to flames. This also causes the temperature of the combustion cylinder 202 via the partition plate 209 to rise. When the temperature reaches a specified level, the thermo-tape 265 used for verifying ignition undergoes discoloration, thereby allowing ignition to be visually verified. Hence, it becomes possible to verify the ignition of gas without laborious observation of flames through a window formed on a lower part of the portable heater.

If gas from the burner 210 is not ignited, the temperature of the cylinder 202 will not rise, and hence the thermo-tape 265 will fail to become decolorated. Thus, it is possible to easily inform the user that an ignition operation using the ignition lever 218 is necessary again.

When the contents of the container 206 are heated by continuing combustion for a predetermined period, the valve mechanism 224 is opened and closed by pressing a flame extinguishing button, thereby interrupting the supply of gas. At this time, the heat-insulating member 214 has already become hot by heat radiated from the cylinder 202, and the thermo-tape 268 has undergone discoloration. From the discoloration of the thermo-tape 268, the user can notice that it is dangerous for the user to touch the heat-insulating member 214 of the portable heater with bare hands.

FIG. 44 shows another modified example, in which a rectangular window 270 is defined on an upper part of the heat insulating member 214. It is possible to observe a thermo-tape used for managing a temperature, for example, a digital thermo-tape attached to the surface of the combustion cylinder 202 through this window 270. Preset figures, for instance, letters which can be read as 50° C. and 80 ° C. are provided on the thermo-tape 271, and these figures appear on the tape when the tape reaches a predetermined temperature. Letters which can be read as "Verify Ignition" and "Handle Carefully" are printed below the window 270 of the heat-insulating member 214.

The thermo-tape may be set in such a manner that letters such as "Ignition", "Under Combustion", "Handle Carefully" or the like appear instead of the indication of a temperature.

Tenth Embodiment

FIGS. 45 to 51 52A–52C show a portable heater having a safety device according to this embodiment. This embodiment is an example of a portable heater equipped with an overturn safety device which automatically extinguishes flames when the heater overturns as well as a similar extinguished-flame safety device to the eighth embodiment.

A portable heater 310 is provided with a combustion cylinder 312; a container to be heated 314 fixedly housed in an upper inside of this combustion cylinder 312; a burner 316 fixedly housed in a lower inside of the cylinder 312; and an ignition means 311 for causing the burner 316 to be ignited.

An exhaust plate 317 is disposed across between the upper edges of the combustion cylinder 312 and the container 314 on the upper end of the combustion cylinder 312. The exhaust plate 317 is annularly formed, and exhaust holes 317a are opened at given intervals along the circumference of the plate. Meanwhile, one end of an operation rod 318 used for igniting the burner 316 extends upwards along the cylinder 312, and is arranged in such a manner that the rod causes ignition when it is pressed. The detailed structure of the operation rod 318 will be described later. The downward pressing of the rod causes the ignition means 311 formed at the bottom of the heater to be operated, thereby igniting the burner 316. An upper end 318a of the operation rod 318 that extends upwards through the exhaust plate 317 is arranged such that it can be hinged toward the inside of the top of the container 314. The operation rod 318 is formed such that it is removed from the combustion cylinder 312 by pulling it upwards. This rod is inserted into the container at another position on the exhaust plate to cause flames to be extinguished.

In addition, the container 314 has a heat-resisting can body 314a, and the upper end of the can body is sealed by a cap 314b having an opening pull tab 315. This container stores contents such as water. An opening member 321 is arranged for causing the opening of the pull-tab 315 and the ignition of the operation rod 318 to be associatedly performed. This opening member 321 is engaged with the upper end 318a (which is forced in an upright direction) which is hinged toward the side of the operation rod 318 as well as the pull-tab 315. The pull-tab 315 is raised by pulling the opening member 321, and the upper end 318a of the operation rod 318 is released and then stands upright. The operation rod 318 is pressed downwards by folding the opening member 321 again, thereby causing the burner 316 to be ignited.

An ignition verification member 322 made of a heat-sensitive material such as a heat-sensitive paint similar to the previous example is formed on an upper outer surface of the combustion cylinder 312. This ignition verification member 322 has a heat-sensitive characteristic that undergoes discoloration or the development of color when the temperature of the member reaches a predetermined level when it is heated with combustion gas which rises along the combustion cylinder 312 as a result of the ignition of the burner 316. The verification member 312 is composed of, for example, a heat-sensitive material which undergoes discoloration at a temperature of 40° C. or thereabouts. In addition to this, a high-temperature warning member 323 is arranged side by side with the verification member 322, and is composed of a heat-sensitive material that undergoes discoloration at a temperature of 60° C. or thereabouts.

A set of first air-inlet holes 312a and second air-inlet holes 312b are opened for introducing air for combustion purposes on the combustion cylinder 312 in the vicinity of the burner 316 at the bottom of the container. The set of the first air-inlet hole 312a is composed of five small holes, and is opened below the burner 316. The second air-inlet holes 312b which laterally extend are formed at four points on the periphery of the cylinder above the burner 316. A plate 324 having perforations is disposed to the inside of this second air-intake hole 312b. This plate 324 serves to prevent flames from being extinguished by wind from the outside, or to prevent backfire from the inside.

A corrugated paper or a heat-insulating material 325 such as paper is laminated over the outer periphery of the combustion cylinder 312. However, as with the previous embodiment, the ignition verification member 322 and the high-temperature warning member 323 are directly disposed on the corrugated paper or the heat-insulating material 325 in accordance with the heat-sensitive characteristic of the verification member and the warning member.

The concrete structure of the burner 316 and its ignition means 311 will now be described. The burner 316 is disposed at the center of the heater below the underneath of the container 314 at a predetermined distance. The burner is produced by pressing a metal plate, and is made up of a gas inlet section 316a and a gas outlet section 316b having gas outlet holes. A fuel tank 327 for storing fuel to be supplied to this burner 316 is disposed on a base member 331 at the bottom of the heater. This fuel tank 327 has a metal cylinder 327a and the front part of this cylinder is closed by a closing member 327b. A valve mechanism 328 for closing and opening the supply of gas is disposed above this front section of the cylinder. A fuel pipe 329 is connected between the valve mechanism 328 and the gas inlet section 316a of the burner 316. The fuel tank 327 is made of transparent plastic, and a part of the tank protrudes so that the amount of remaining fuel can be checked from the outside.

The ignition means 311, the extinguished-flame safety device 330 and an overturn safety device 340 are disposed around the burner 316 and the fuel tank 327.

The ignition means 311 is provided with an ignition lever 333 for supplying gas to the burner 316 and igniting the gas. The ignition lever 333 extends on both sides of the fuel tank 327, and one end of the lever is pivotally supported by a rotating shaft 334, and the other end of the lever is connected to a part of a connection part 333a in front of the fuel tank 327. The lower end of the operation rod 318 engages with a part of the connection part 333a, that is an engagement section 333b. The downward pressing of the rod causes the ignition lever 333 to rotate downwardly.

A first arm 336 is arranged in a pivotal manner for closing and opening the valve mechanism 328. This first arm 336 has an engagement section 336a which is formed at one end of the arm, and this engagement section engages with the valve mechanism 328. An upper plate member of the arm extends to both sides, and the both ends of the plate angularly extend downwards within the ignition lever 333. Lower ends 336b of the plate member are engageable with the lower side of an intermediate portion of the ignition lever 333 that is pivotally moved while it remains in a horizontal state (see FIG. 50). When this ignition lever 333 is pressed down, the lower ends 336b of the first arm 336 engage with the ignition lever 333, and hence the first arm is pivoted downwardly. Thereby, the engagement section 336a causes the valve mechanism 328 to open, and gas is supplied from the fuel tank 327 to the burner 316.

A second arm 337 which rotates as a result of a rotatory operation of the lever is fixed to the ignition lever 333. The second arm 337 causes a piezoelectric ignition unit 338 to be operated. The pressing of the ignition lever 333 causes the ignition unit 338 to apply a discharge voltage to a discharge electrode 339 (see FIG. 49), thereby causing ignition combustion.

Figure 52A:
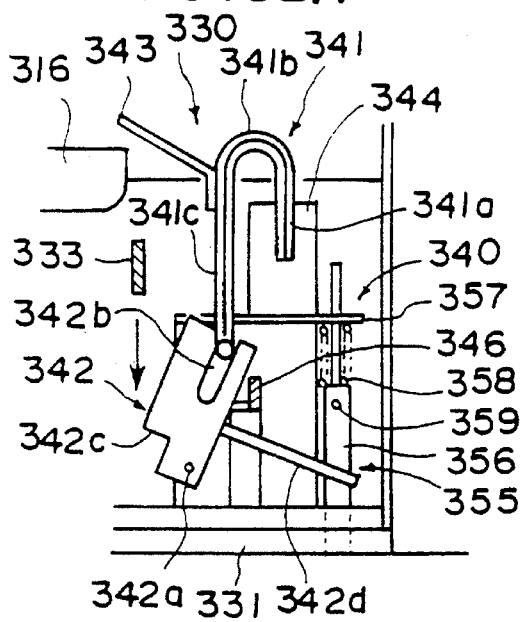
FIGS. 52A–52C are front views showing, in sequence, operating conditions of an overturn safety device and an extinguished-flame safety device.
Figure 52B:
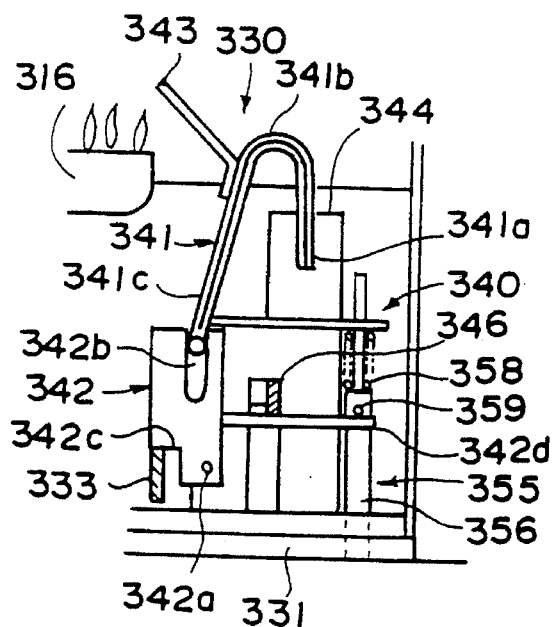
Figure 52C:
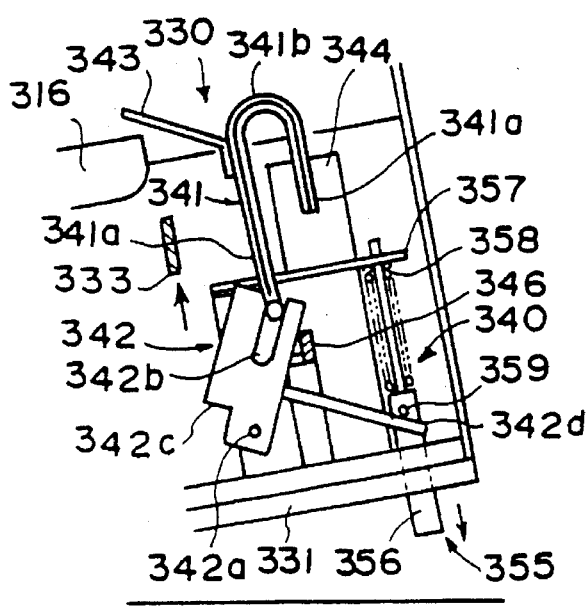

Meanwhile, the extinguished-flame safety device 330 is equipped with a bimetal member 341 as shown in FIGS. 52A–52C. This bimetal member 341 is formed into an inverted U-shape. One end 341a of the bimetal member is fixed to the upper end of a support section 344, and a displaceable section 341c on the other end of the bimetal member extends from this fixed section 341a via a curved section 341b. That end of the bimetal member is engaged with a regulation member 342 (a hook). The regulation member 342 is rotatably supported by a pivot 342a, and the upper end of the slit 342b is engaged with the end (a pin) of the displaceable section 341c of the bimetal member 341. The regulation member pivotally moves in accordance with the thermal deformation of the bimetal member. The end of a hook portion 342c formed on a lower side surface of the regulation member moves to a position above the ignition lever 333, and is engageable with the same. An engagement position of the regulation member 342 is set in such a manner that when the ignition lever 333 is pressed down, that is the lever is situated at an ignition operation position, the regulation member engages with the upper side of the lever 333, thereby holding the lever at the ignition operation position (a combustion position). The curved section 341b of the bimetal member 341 is connected to a heat-sensitive section 343.

Figure 51:
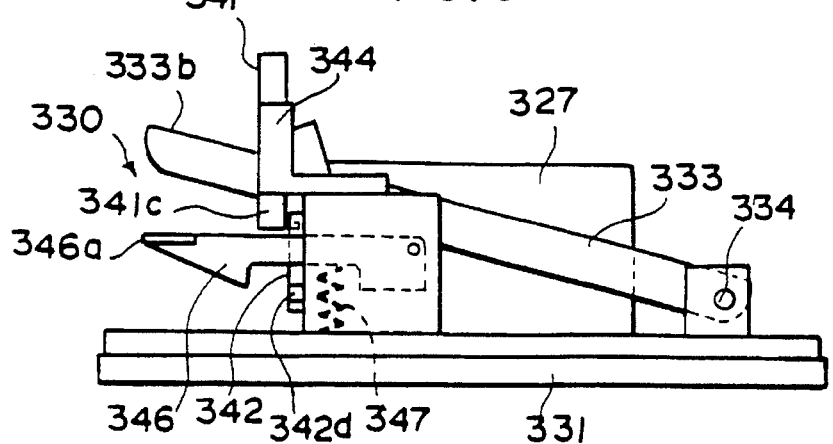
FIG. 51 is a side elevation view of the chief portion of the heater showing the other side of the heater.

As shown in FIG. 51, a flame-extinguishing mechanism is connected to the regulation member 342 for extinguishing flames after the combustion is completed. This mechanism has an engagement leaf 342d that extends substantially laterally from the regulation member 342. A flame-extinguishing lever 346 is disposed in a vertically rotatable fashion above the engagement leaf 342d. The flame-extinguishing lever 346 is forced upwards by a return spring 347. An engagement section 346a formed at the end of the lever extends to the vicinity of an internal periphery of the combustion cylinder 312. This engagement section 346a can be pressed down in the same manner as the ignition lever 333 by means of the operation rod 318 that is inserted above the heater at a position which is different from the ignition position corresponding to the engagement section 333b of the ignition lever 333. The pressing of this engagement section causes the engagement leaf 342d of the regulation member 342 which remains in a combustion holding state as shown in FIG. 52B to be downwardly rotated, thereby releasing the ignition lever 333 held by the regulation member 342.

The overturn safety device 340 is provided with an overturn sensor 355 which is actuated upon detection of a fallen state of the heater 310. The overturn sensor 355 has a rod-shaped sensing member 356, and the end of this sensing member projects in a retractable fashion from the underneath of the base member 331. This sensing member 356 is vertically slidable in the vicinity of the end of the leaf 342d of the regulation member 342. A support plate 357 disposed above the sensing member 356 is forced upwards by a spring sandwiched between them in a contracted manner. This sensing member 356 is provided with a link member 359 (a pin) which causes the regulation member 342 to rotate in a direction of the extinguishing of flames in conjunction with the leaf 342d when the heater overturns. The end of the sensing member 356 is retracted when the heater stands upright as shown in FIGS. 52A and 52B. However, when the heater overturns as shown in FIG. 52C, the end of the sensing member projects from the base member 331, and hence the link member 359 engages with the leaf 342d. This causes the regulation member 342 to rotate downwardly, which releases the ignition lever 333 held by the regulation member.

Bead-like engagement protuberances 312c that project to the inside of the combustion cylinder are formed on the cylinder 312 at positions which corresponding to the upper and lower ends of the partition member 313. The corrugated partition member 313 is fixedly inserted between these protuberances along the combustion cylinder 312, thereby fixedly holding the container 314. This partition member 313 has a lower turned up end in a predetermined size that is folded to the inside of the heater, and the upper end of this turn-up is formed into a bottom holding section 313a for supporting the outer periphery of the bottom of the container 314. An inner flange 317b of the exhaust plate 317 engages with the upper edge of the container 314. A heat-transfer plate 352 is disposed for transferring heat of the burner 316 to the fuel tank 327.

The heating of the foregoing embodiment will now be described. When a heater is in a non-used preserved state, the opening member 321 that engages with the pull-tab 315 is mounted in a flat state on the top of the container 314. The end 318a of the operation rod 318 is hinged and housed in the opening member. In this extinguished state, as shown in FIG. 52A, the ignition lever 333 is situated at an elevated position, and the bimetal member 341 remains intact. The regulation member 342 is positioned at a location where it allows vertical movement of the ignition lever 333. At this time, when the heater stands upright, the lower end of the sensing member 356 of the overturn sensor 355 comes into contact with a mounting surface. The sensing member 356 moves to a retracted position under the weight of the heater 310 against the spring 358, and hence the sensing member is prevented from interrupting the pivotal movement of the regulation member 342.

When the container 314 is heated by starting combustion using the burner 316 which is in an extinguished state, the pull-tab 315 is pulled by sliding the opening member 321 to the operation rod side and then pulling it up, thereby opening the container 314. Then, the end 318a of the operation rod 318 is released and stands upright. After the container 314 has been opened, the opening member 321 is returned to its horizontal state. This causes the operation rod 318 to be pressed downwards, and hence the ignition lever 333 is pressed, thereby causing ignition. Thereby, gas is emitted from the burner 316 and ignited. Immediately after the combustion starts, the bimetal member still remains undeformed, and hence the regulation member 342 is positioned at a released position.

After the combustion starts, when a predetermined time has elapsed while the ignition lever 333 is depressed, the bimetal member 341 is thermally deformed upon receipt of combustion heat from-the heat-sensitive section 343. As shown in FIG. 52B, the regulation member pivotally moves such that the hook 342c of the regulation member 342 projects above the ignition lever 333, whereby the upward return movement of the ignition lever 333 is hindered when a hand is released from the operation rod 318. Thus, the emission of gas from the burner 316 is maintained, and combustion continues.

During the operation of the extinguished-flame safety device 330, combustion gas produced by the burner 316 rises through a gap between the combustion cylinder 312 and the container 314. The combustion cylinder 312 is heated via the partition member 313, and the temperature of this combustion cylinder 312 rises in accordance with a time that has elapsed from the ignition of the burner 316. When the temperature reaches a preset value, the ignition verification member 322 undergoes discoloration or the development of color. The heat-sensitive characteristic of this member is set in conjunction with the operation of the extinguished-flame safety device 330. Thereby, the verification of ignition of the burner 316 and the maintenance of combustion can be carried out. The ignition operation of the opening member 321 is released by the verification of the discoloration or the development of color of the ignition verification member 322, whereby combustion is maintained.

When the heater 310 overturns due to an external force which is exerted on the heater during combustion, the end of the sensing member 356 of the overturn sensor 355 comes off from the mounting surface as shown in FIG. 52C. Then, the sensing member 356 projects under a thrusting force of the spring 358. This causes the link member 359 (a pin) to engage with the leaf 342d, and hence causes the regulation member 342 to rotate downwardly. The hook 342c is disengaged from the ignition lever 333, and the ignition lever 333 thus released returns upwards, whereby the supply of gas to the burner 316 is automatically interrupted, and flames are extinguished.

If flames are extinguished during combustion by wind or the boiling over of the liquid, the bimetal member 341 is deformed and recedes in proportion to a drop in temperature, and hence the regulation member 342 is rotated. This causes the hook 342c to be disengaged from the ignition lever 333, and the return rotation, i.e. the rise of the ignition lever 333 interrupts the supply of gas. Thus, the emission of gas while the heater is in an extinguished state is prevented. When flames are extinguished, the operation rod 318 removed from the ignition position is inserted into a flame-extinguishing position that corresponds to the engagement section 346a of the ignition lever 346. This causes the regulation member 342 to forcedly rotate, and hence the regulation member is disengaged from the ignition lever 333. The ignition lever 333 then returns to its original position, whereby the heater enters an extinguished state.

In this embodiment, although the examples have the overturn safety device 340 incorporated into the extinguished-flame safety device 330 that is made of the bimetal member 341, a flame extinguishing mechanism, dispensing with the bimetal member 341 but having a regulation member for holding the ignition lever 333 in a combustion position when the heater 310 stands upright, may be disposed for causing the regulation member to rotate in conjunction with the movement of the sensing member 356 when the heater overturns in the same manner as the previous example.

Eleventh Embodiment

Figure 53:
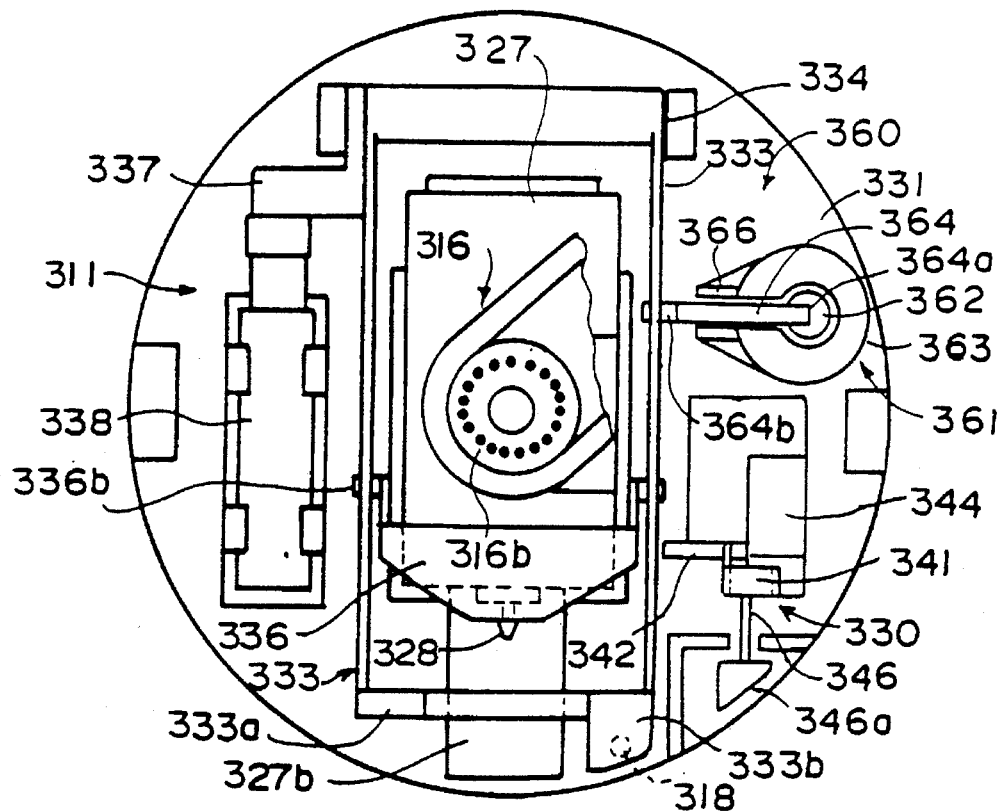
FIG. 53 is a plan view showing a base of a portable heater equipped with a safety device according to an eleventh embodiment of this invention.
Figure 54:
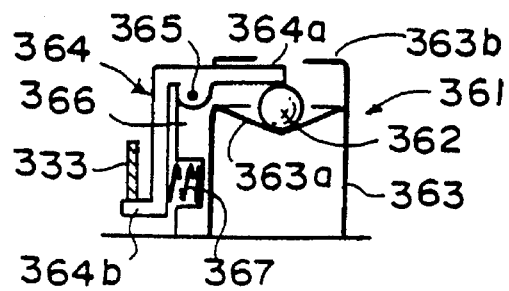
FIG. 54 is a cross-sectional view showing the safety device as shown in FIG. 53.
Figure 55:
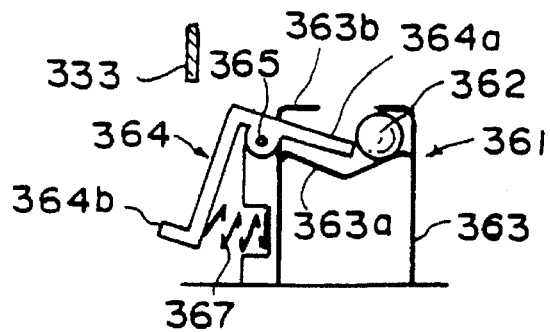
FIG. 55 is a cross-sectional view showing operating conditions of the heater as shown in FIG. 54.

This embodiment is a modified example of the tenth embodiment. FIGS. 53 to 55 show another example of the overturn safety device. The device is equipped with an overturn sensor using a steel ball. The ignition means 311 and the extinguished-flame safety device 330 are constituted in the same manner as the previous embodiment, and hence the same reference numerals are provided to corresponding features.

An overturn safety device 360 of this embodiment has an overturn sensor 361 disposed by the side of the ignition lever 333. The overturn sensor 361 has a receiving table 363, and a sensing member 362 made of a steel ball is placed on a dish-shaped concaved surface 363a on the table. The center of the concaved surface 363a is lowered, and the sensing member 362 is situated at this center when the heater 310 stands upright. A cover 363b covers the concaved surface 363a of the receiving table 363 for preventing the sensing member 362 from dropping from the surface.

A link member 364 made of an arm is provided for regulating the movement of the ignition lever 333 in conjunction with the movement of the sensing member 362. The link member 364 is formed into a crank, and the middle of the link member is supported by a pin 365 on the upper end of a support 366 in a pivotal manner. A sensor-side end 364a of the link member pivots vertically, and this end extends to a position above the center of the concaved surface 363a. The other end of the link member is bent downwards, and the lower end of it is further bent horizontally, thereby constituting an engagement end 364b. This engagement end 364b is arranged such that it can engage with a lower part of the ignition lever 333. Moreover, the link member 364 is thrust to rotate upwards by a return spring 367. The sensing member 362 is situated at the center of the concave surface 363a when the heater 310 stands upright. If the heater overturns, the sensing member moves to a surrounding area of the center. In response to this, the link member 364 is pivotally moved.

The operation of the heater of this embodiment will now be described. FIGS. 54 and 55 show the heater when it stands upright from its preserved state as well as an overturned state. When the heater stands upright before ignition, the ignition lever 333 is at an elevated position. Hence, the link member 364 is in a free state. When the heater stands upright from its lying state, or a preserved state, the steel ball is displaced from the center of the concave surface, and the link member 364 is pivotally moved by the return spring 367. When the ignition lever 333 is pressed down as a result of an ignition operation, the burner 316 is ignited. In addition, the ignition lever also presses down the engagement end 364b of the link member 364 when it reaches its lowermost position. Thereby, as shown in FIG. 54, the sensing member 362 made of a steel ball moves to a position below the sensor-side end 364a of the link member 364. This regulates the pivotal return movement of the link member 364. The regulation member 342 is actuated in accordance with the deformation of the bimetal member 341 as a result of combustion. This regulation member holds the ignition lever 333 at a combustion position, and hence combustion continues.

When the heater enters in an overturned state from the combustion state, the sensing member 362 of the overturn sensor 361 moves to a surrounding area of the center as shown in FIG. 55. This causes the link member 364 to be released from its regulated state, and the link member 364 rotates with the help of the return spring 367. The link member is thrust by the spring such that the engagement end 364b engages with the bottom side of the ignition lever 333, and the ignition lever 333 is raised. The regulation member 342 is forcedly released from its holding state, and hence the ignition lever 333 is pivotally moved upwards. This interrupts the supply of gas to the burner 316, and flames are extinguished. The extinguished-flame safety device operates in the same way as in the previous embodiment.

Twelfth Embodiment

Figure 56:
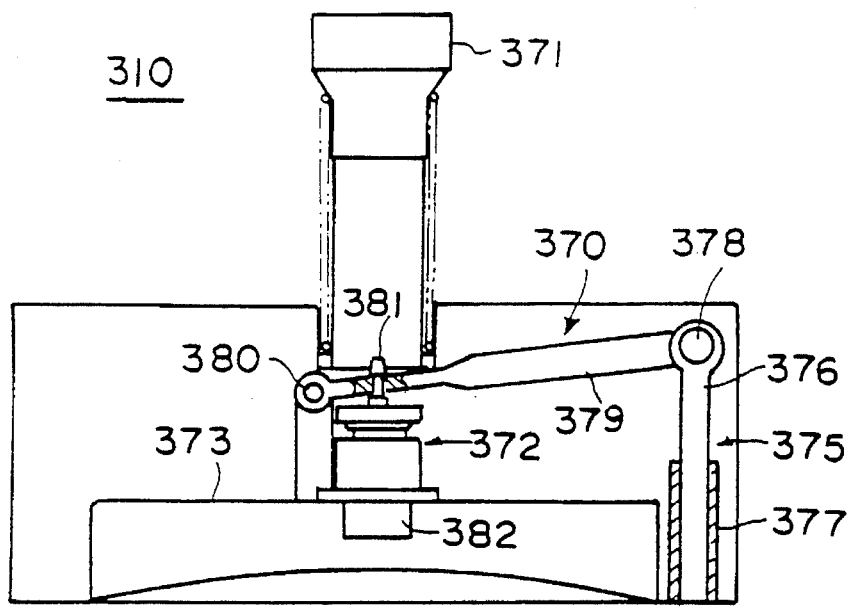
FIG. 56 is a cross-sectional front view of the chief portion of the base of the portable heater equipped with the safety device according to a twelfth embodiment of this invention.
Figure 57:
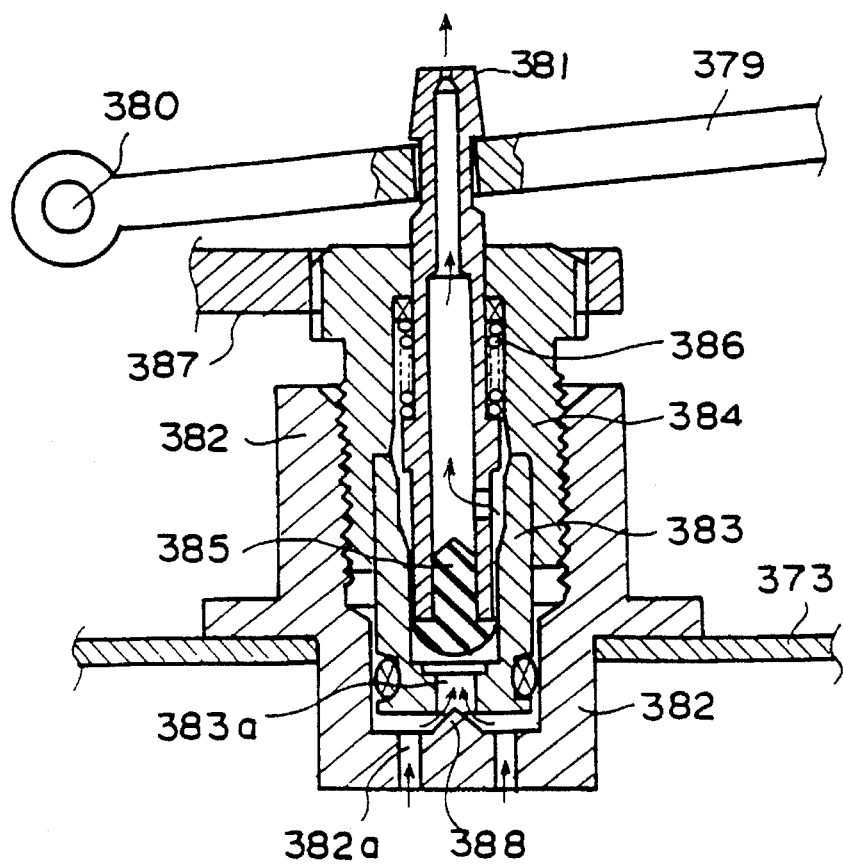
FIG. 57 is a cross-sectional view of the chief portion of a valve mechanism as shown in FIG. 56.

This embodiment is a modified example of the tenth embodiment. FIGS. 56 and 57 show the example, and this example is different in an ignition means from that of the tenth embodiment. In response to this difference, an overturn safety device 370 is also changed.

A burner 371 of the portable heater 310 according to this embodiment is cylindrically formed. A valve mechanism 372 used for emission of gas is disposed at the lower end of the burner 371. The valve mechanism 372 is disposed on the top of a fuel tank 373. Though not shown in the drawings, the combustion cylinder 312 and the container 314 or the like similar to those in the previous embodiment are disposed above the burner 371.

The valve mechanism 372 has a nozzle 381 for closing and opening the emission of gas when it is raised or lowered in conjunction with a link member 379 of an overturn sensor 375. In other words, as with the tenth embodiment, the overturn sensor 375 has a rod-shaped sensing member 376 which projects downwards from the underneath of the portable heater 310 in a retractable manner along a guide member 377. The sensing member 376 projects if the heater overturns, but is retracted when the heater stands upright. The upper end of the sensing member 376 is connected to one end of the lever-shaped link member 379 via a connecting part 378. The inner end of this link member 379 is supported by a pivot 380 in a pivotable manner. A part of the link member 379 which is close to its inner end is engaged with the upper end of the nozzle 381.

The detailed structure of the valve mechanism 372 is shown in FIG. 57 (illustrating when the valve emits gas). A valve housing 382 is fixed to an upper wall of the fuel tank 327. The nozzle 381 is housed in a nozzle bottom 383 and a nozzle casing 384. A nozzle valve rubber 385 is attached to the lower end of the nozzle. The nozzle is thrust downward by a nozzle spring 386 in such a manner that the nozzle valve rubber 385 closes a bottom opening 383a of the nozzle bottom 383. This nozzle spring 386 also thrusts the sensing member 376 in a projecting direction via the link member 379.

The nozzle casing 384 is screwed into the valve housing 382 by means of a thread formed on the outer periphery of the casing. The ignition lever 387 that is operated in a lateral direction is fixed to the top of this nozzle casing 384. The nozzle casing 384 is rotated in accordance with the lateral rotation of the ignition lever 387. This causes the nozzle casing 384 to vertically move together with the nozzle bottom 383 with respect to the valve housing 382.

The lower end of the bottom opening 383a of the nozzle bottom 383 is opened and closed in accordance with the vertical movement of the nozzle bottom by means of a needle valve 388 formed on the bottom of the valve housing 382. Connection holes 382a are drilled on the bottom of the valve housing 382, so that they are connected to the inside of the fuel tank 373. As shown in the drawing, the upper and lower ends of the bottom opening 383a of the nozzle bottom 383 are open, a flow channel is constituted such that gas flows through the inside of the nozzle 382, and is emitted from the tip end of the nozzle via the connection holes 382a and the bottom opening 383a.

The operation of this portable heater of this embodiment will now be described. When the heater stands upright before it is in use, the sensing member 376 is retracted, and the link member 379 rotates upwards. This causes the nozzle 381 to be raised, and the nozzle valve rubber 385 is also raised. Thereby, the upper end of the bottom opening 383a is opened, but its lower end remains closed by the needle valve 388, thereby preventing the emission of gas. When the ignition lever 387 is rotated as a result of an ignition operation, the nozzle casing 384 is also rotated, whereby the nozzle bottom 383 is raised and detached from the needle valve 388. This causes the bottom end of the bottom opening 383a to be opened, and gas is emitted from the end of the nozzle via the connection holes 382a, the bottom opening 383a and the inside of the nozzle 381. Thus, the burner 371 starts combustion.

When the heater enters into an overturned state from the combustion state, the sensing member 376 of the overturn sensor 375 becomes possible to project. The sensing member 376 projects under a thrusting force of the nozzle spring 386, and the nozzle 381 is lowered, whereby the nozzle valve rubber 385 on the lower end of the nozzle close the bottom opening 383a. This interrupts the emission of gas, and hence automatically extinguishes flames. Also, the nozzle bottom 383 is lowered by operating the ignition lever 387 in a direction of the extinguishing of flames, and the bottom opening 383a of the nozzle bottom is closed by the needle valve 388. Thus, the supply of gas is interrupted, and flames are extinguished.

What is claimed is:

1. A portable heater comprising a combustion cylinder, a burner disposed at a bottom of the combustion cylinder, a container to be heated which is disposed in an upper part of the combustion cylinder for storing contents to be heated when the heater is in use, a fuel tank for storing fuel gas to be supplied to the burner, an ignition means having an igniter and an ignition lever for actuating the igniter which causes the ignition of fuel in the burner and display means disposed on an outer periphery of the combustion cylinder including first display means for displaying an indication that fuel is burning the burner and second display means for displaying an indication that the contents of the container have been heated.

2. A portable heater as defined in claim 1, wherein one of the first and second display means is directly provided on the surface of the combustion cylinder, and the other of the first and second display means is disposed on a heat-insulating member which is arranged on the outer periphery of the combustion cylinder.

3. A portable heater as defined in claim 1, wherein the display means informs the user that the temperature of the heater has reached a specified temperature when a color of the display means becomes the same as a color adjacent to the display means.

4. A portable heater as defined in claim 1, wherein the display means shows selected letters or digits when the temperature of the heater has reached a specified temperature.

* * * * *

UNITED STATES PATENT AND TRADEMARK OFFICE
CERTIFICATE OF CORRECTION

PATENT NO. : 5,598,833
DATED : February 4, 1997
INVENTOR(S) : Tomio Nitta et al.

It is certified that error appears in the above-indentified patent and that said Letters Patent is hereby corrected as shown below:

Column 6, line 31: "cross-section" should read --cross-sectional--.

Column 9, line 40: "pivotable" should read --pivotably--.

Column 9, line 47: "cause" should read --causes--.

Column 10, line 4: "cause" should read --causes--.

Column 10, line 6: "pressed" should read --be pressed--.

Column 10, line 33: "cause" should read --causes--.

Column 11, line 30: "116aand" should read --116a and--.

Column 14, line 14 :"FIG. 26" should read --FIGS. 26A-26D--.

Column 17, line 45: "shows" should read --show--.

UNITED STATES PATENT AND TRADEMARK OFFICE
CERTIFICATE OF CORRECTION

PATENT NO. : 5,598,833
DATED : February 4, 1997
INVENTOR(S) : Tomio Nitta et al.

It is certified that error appears in the above-indentified patent and that said Letters Patent is hereby corrected as shown below:

Column 18, line 62: "shows" should read --show--.

Column 20, line 46: "decolorated" should read --discolorated--.

Column 21, line 9: "51" should read --51 and--.

Column 24, line 16: "corresponding" should read --correspond--.

Column 28, line 23: "close" should read --closes--.

Column 28, line 42: "burning" should read --burning in--.

Signed and Sealed this

Fifteenth Day of July, 1997

Attest:

BRUCE LEHMAN

*Attesting Officer*   *Commissioner of Patents and Trademarks*